United States Patent
Kasuno et al.

(10) Patent No.: US 11,458,385 B2
(45) Date of Patent: Oct. 4, 2022

(54) STORAGE MEDIUM STORING INFORMATION PROCESSING PROGRAM, INFORMATION PROCESSING SYSTEM, INFORMATION PROCESSING APPARATUS AND INFORMATION PROCESSING METHOD

(71) Applicant: NINTENDO CO., LTD., Kyoto (JP)

(72) Inventors: Shinichi Kasuno, Kyoto (JP); Yuki Onozawa, Kyoto (JP); Yuki Ijiri, Kyoto (JP); Yasuhiro Inoue, Kyoto (JP); Shinji Hirose, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 458 days.

(21) Appl. No.: 16/190,407

(22) Filed: Nov. 14, 2018

(65) Prior Publication Data

US 2019/0192962 A1     Jun. 27, 2019

(30) Foreign Application Priority Data

Dec. 27, 2017  (JP) .............................. JP2017-251046

(51) Int. Cl.
- *A63F 13/213* (2014.01)
- *A63F 13/245* (2014.01)
- *A63F 13/235* (2014.01)
- *A63F 13/22* (2014.01)
- *A63F 13/98* (2014.01)

(52) U.S. Cl.
CPC ............ *A63F 13/213* (2014.09); *A63F 13/22* (2014.09); *A63F 13/235* (2014.09); *A63F 13/245* (2014.09); *A63F 13/98* (2014.09)

(58) Field of Classification Search
CPC ........ A63F 13/213; A63F 13/22; A63F 13/98; A63F 13/235; A63F 13/245

USPC ...................................................... 463/27, 37
See application file for complete search history.

(56) References Cited

U.S. PATENT DOCUMENTS

| | | | |
|---|---|---|---|
| 2005/0255915 A1* | 11/2005 | Riggs ...................... | A63F 13/22 463/37 |
| 2009/0270183 A1* | 10/2009 | Lin ...................... | A63F 3/00643 463/43 |

(Continued)

FOREIGN PATENT DOCUMENTS

| EP | 3 057 297 A1 | 8/2016 |
|---|---|---|
| JP | 10-312238 | 11/1998 |

(Continued)

OTHER PUBLICATIONS

Notice of Reasons for Refusal dated Dec. 28, 2018 issued in JP Application No. 2017-251046 (5 pgs.) and translation (7 pgs.).

(Continued)

*Primary Examiner* — Kang Hu
*Assistant Examiner* — Wei Lee
(74) *Attorney, Agent, or Firm* — Xsensus LLP

(57) ABSTRACT

An example game system includes a plurality of types of sub devices, and a main device capable of being attached to and detached from any of the sub devices, and executes a game application. The game system determines the type of the sub device to which the main device is attached while the game application is being executed. The game system executes a game process based on a game operation performed by using the main device and/or the sub device to which the main device is attached while the game application is being executed. The game system executes a game process depending on the determined type of the sub device.

24 Claims, 29 Drawing Sheets

(56) References Cited

U.S. PATENT DOCUMENTS

| | | | | |
|---|---|---|---|---|
| 2014/0125634 A1* | 5/2014 | Yokokawa | ............... | G06F 3/011 |
| | | | | 345/175 |
| 2014/0274399 A1* | 9/2014 | Mahlmeister | ........... | A63F 13/22 |
| | | | | 463/37 |
| 2017/0354889 A1* | 12/2017 | Adamenko | ............. | A63F 13/65 |

FOREIGN PATENT DOCUMENTS

| | | |
|---|---|---|
| JP | 2007-300980 | 11/2007 |
| JP | 2008-67883 | 3/2008 |

OTHER PUBLICATIONS

Peripheral device of Wii, "Kazoku de Asobu Minna no Wii (Wii for everyone playing with family)", Japan, Mediaboy publishing Co., Ltd., Feb. 1, 2008, p. 29 (4 pgs.).

Partial European Search Report dated Jun. 12, 2019 issued in EP 18204364.6 (17 pgs.).

Artur Sagitov et al., "ARTag, AprilTag and CALTag Fiducial Marker Systems: Comparison in a Presence of Partial Marker Occlusion and Rotation:", Proceedings of The 14$^{th}$ International Conference on Informatics in Control, Automation and Robotics, Jan. 1, 2017, pp. 182-191, XP055590736, DOI: 10.5220/0006478901820191, ISBN: 978-989-7582-64-6, 3.2 Type 2 Experiments: Systematic Occlusion 4 Experimental Results.

Office Action dated Mar. 27, 2019 issued in Japanese Application No. 2017-251046 (4 pgs.).

\* cited by examiner

Fig.22

| | FIRST MODE OF OPERATION | SECOND MODE OF OPERATION |
|---|---|---|
| SECOND ATTACHMENT STATE | STORE FIRST ORIENTATION (MAIN BODY-SIDE SURFACE ORIENTED IN FRONT DIRECTION) | STORE SECOND ORIENTATION (MAIN BODY-SIDE SURFACE ORIENTED IN REAR DIRECTION) |
| NON-ATTACHED STATE | DETECT OPERATIONS ASSUMING THAT MAIN BODY-SIDE SURFACE IS FACING FRONT | DETECT OPERATIONS ASSUMING THAT MAIN BODY-SIDE SURFACE IS FACING REAR |

Fig.26

| STATE OF DEVICE | CAPTURED IMAGE | GAME IMAGE |
|---|---|---|
| PARTIALLY-RECOGNIZED STATE | ENABLE STEERING WHEEL OPERATION | DISPLAY EFFECT (SMOKE) |
| FULLY-RECOGNIZED STATE | ENABLE STEERING WHEEL OPERATION AND LEVER OPERATION | DISPLAY NO EFFECT |

Fig.27

| GAME PROGRAM | 301 |
| --- | --- |
| OPERATION DATA | 302 |
| ATTACHMENT STATE DATA | 303 |
| RECOGNITION STATE DATA | 304 |
| ORIENTATION DATA | 305 |
| FRONT DIRECTION DATA | 306 |
| OBJECT DATA | 307 |

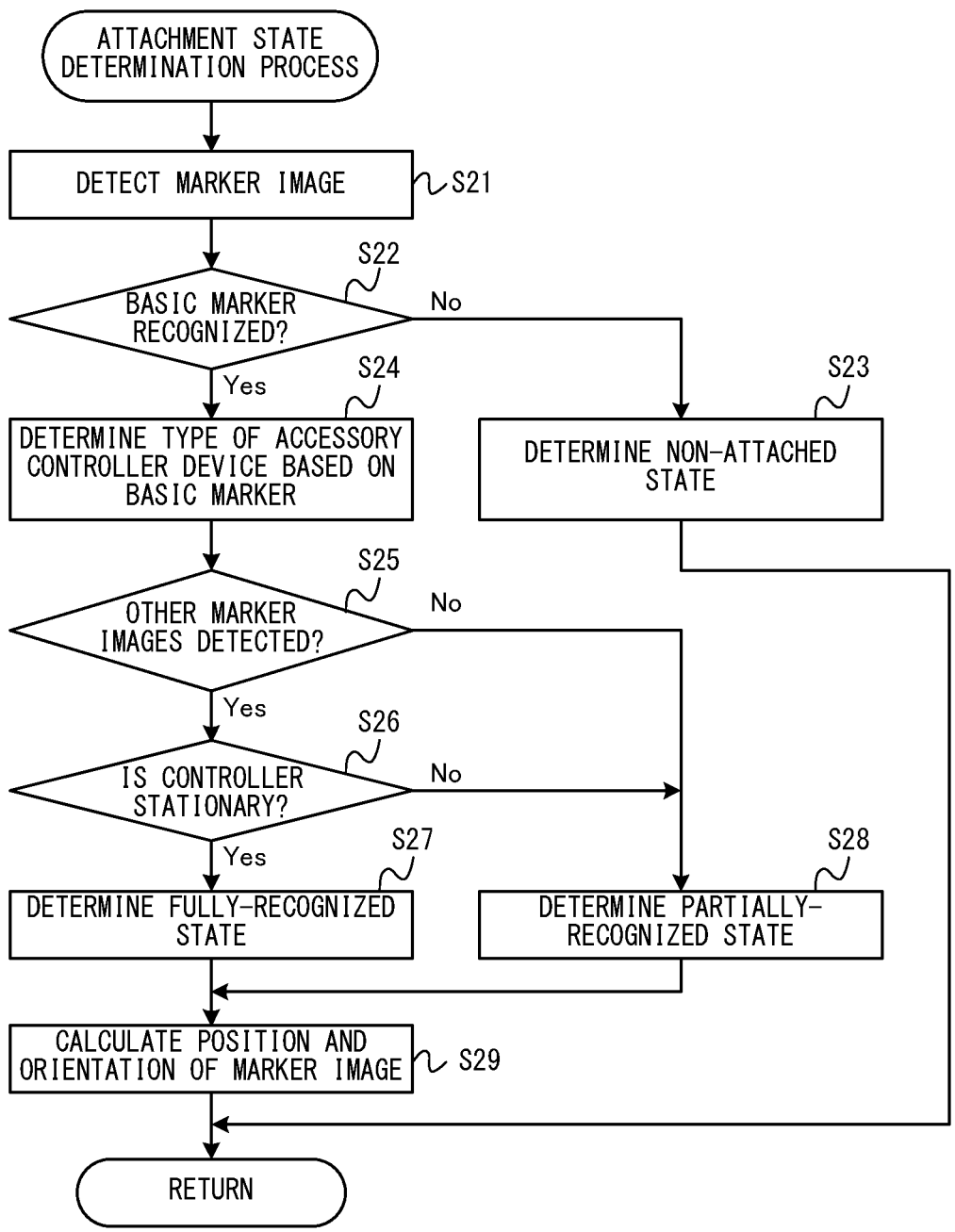

STORAGE MEDIUM STORING INFORMATION PROCESSING PROGRAM, INFORMATION PROCESSING SYSTEM, INFORMATION PROCESSING APPARATUS AND INFORMATION PROCESSING METHOD

CROSS REFERENCE TO RELATED APPLICATION

The disclosure of Japanese Patent Application No. 2017-251046 filed on Dec. 27, 2017 is incorporated herein by reference.

FIELD

The present technique relates to an information processing system in which a device is used while being attached to another device.

BACKGROUND AND SUMMARY

There are conventional information processing systems in which a device (e.g., a controller) is used while being attached to another device in a game application. For example, in some game systems, the user plays the game by using a controller device that includes a core unit (controller) attached to a gun-shaped sub unit.

With conventional techniques, for a game application, a controller is attached to one type of an accessory device that corresponds to the game application. That is, there is only one accessory device to be used for one application, resulting in a poor variety of operations using the accessory device, and there has been room for improvement in terms of playability.

Therefore, the present application discloses an information processing system that improves playability of a game application in which accessory devices are used.

(1)

An example of a storage medium described herein stores an information processing program to be executed by a computer of a game system that executes a game application. The game system includes a plurality of types of sub devices and a main device capable of being attached to and detached from any of the sub devices. The game program causes the computer to function as a determination unit and a game process execution unit. The determination unit is configured to determine the type of the sub device to which the main device is attached while the game application is being executed. The game process execution unit is configured to execute a game process based on a game operation performed by using the main device and/or the sub device to which the main device is attached while the game application is being executed. The game process execution unit executes a game process depending on the type of the sub device determined by the determination unit.

With configuration (1) above, the type of the sub device to which the main device is determined while the game application is being executed, and the game process is executed depending on the determined type of the sub device. Therefore, the user can play the game while switching between sub devices to which the main device is attached while the game application is being executed. Thus, the game system can present, to the user, a novel gaming experience, and can improve the playability of a game application in which sub devices are used.

(2)

The main device may include an image-capturing device. The determination unit may determine the type of the sub device to which the main device is attached based on a captured image that is captured by the image-capturing device.

With configuration (2) above, it is possible to simplify the configuration of the sub device.

(3)

Each of the sub devices may include a detected portion of which an image can be captured by the image-capturing device of the main device that is attached to the sub device. The determination unit determines the type of the sub device to which the main device is attached based on at least one of a position, a shape and an orientation of a first detected portion image representing at least a portion of the detected portion included in the captured image.

With configuration (3) above, it is possible to simplify the configuration of the sub device.

(4)

At least one of the sub devices may further include a movable portion that moves in accordance with an operation performed by the user. As the movable portion is moved in accordance with an operation performed by the user, a relative position and/or a relative attitude between the main device attached to the sub device including the movable portion and the detected portion of the sub device may change. The game process execution unit may show at least a portion of the detected portion included in the captured image, and detect an operation performed by the user based on at least one of a position, a shape and an orientation of the first detected portion image and/or a second detected portion image to execute a game process based on the detected user operation.

With configuration (4) above, the game system can detect an operation that is performed by the user with the sub device as well as determining the type of the sub device.

(5)

The detected portion may be at a position on the movable portion such that an image thereof can be captured by the image-capturing device of the main device attached to the sub device including the movable portion. The relative position and/or the relative attitude between the main device and the detected portion may change as the detected portion moves with the movable portion moved in accordance with an operation performed by the user.

With configuration (5) above, with the provision of the detected portion on the movable portion, the game system can easily detect, from the captured image, the relative position and/or the relative attitude between the main device and the detected portion.

(6)

The main device may be capable of being attached to the movable portion. The relative position and/or the relative attitude between the main device and the detected portion may change as the main device attached to the movable portion moves with the movable portion moved in accordance with an operation performed by the user.

With configuration (6) above, the main device is capable of being attached to the movable portion, and the game system can therefore easily detect, from the captured image, the relative position and/or the relative attitude between the main device and the detected portion.

(7)

The game process execution unit may generate a different game image depending on the determined type of the sub device.

With configuration (7) above, the game image varies depending on the type of the sub device to which the main device is attached, the game system can therefore allow the user to easily recognize the attachment state of the main device.

(8)

The game process execution unit may control an object placed in a virtual space based on a game operation using the main device and/or the sub device to which the main device is attached. The game process execution unit may change the object depending on the determined type of the sub device.

With configuration (8) above, the user can change an object to be the controlled object by changing the sub device to which the main device is attached. Thus, the game system can present a novel game operation to the user.

(9)

The object may be an object representing a vehicle on which a game character can ride.

With configuration (9) above, the user can switch the vehicle object to be operated from one to another by changing the sub device to which the main device is attached, and the game system can provide a game with high playability.

(10)

The main device may include a plurality of types of operation detection portions for detecting an operation performed by the user with the main device. When it is determined that the main device is attached to a certain type of a sub device, the game process unit may execute a game process based on a detection result from one of the plurality of types of operation detection portion that corresponds to the determined type of the sub device.

With configuration (10) above, the game system can execute the game process based on the detection result from a suitable operation detection portion depending on the type of the sub device to which the main device is attached. When switching the sub device to which the main device is attached, the user needs little trouble changing the game settings (e.g., settings regarding the operation detection portion), thus improving the convenience for the user.

(11)

The main device may include an operation detection portion configured to detect operations performed by the user with the main device. The game process unit may determine content of a game process to be executed based on a detection result from the operation detection portion depending on the determined type of the sub device.

With configuration (11) above, the game system can suitably set the content of the game process to be executed in accordance with the detection result from the operation detection portion depending on the type of the sub device to which the main device is attached. When switching the sub device to which the main device is attached, the user needs little trouble changing the game settings, thus improving the convenience for the user.

(12)

The game process unit may control a position and/or an attitude of a virtual camera placed in a virtual space depending on the determined type of the sub device.

With configuration (12) above, the game system can provide the user with a game image as seen from a point of view that is suitable for circumstances in the game. When switching the sub device to which the main device is attached, the user needs little trouble changing the virtual camera settings, thus improving the convenience for the user.

(13)

The determination unit may further determine that the main device is attached to none of the sub devices.

With configuration (13) above, the game system can detect the state where the main device is attached to no sub device.

(14)

When it is determined that the main device is attached to none of the sub devices, the game process execution unit may execute a game process that is different from those executed when the main device is attached to any of the sub devices.

With configuration (14) above, by looking at the game image, the user can recognize whether or not the main device is attached to any sub device, in addition to the type of the sub device to which the main device is attached. Thus, the game system can make the user recognize the attachment state of the main device in greater detail.

(15)

The game system may further include a storage section. The processing program may cause the computer to further function as a storage control unit. The storage control unit is configured to, when it is determined that the main device is attached to a certain type of a sub device, store, in the storage section, device orientation information regarding an orientation of the main device with respect to the certain type of the sub device. The game process execution unit may execute a game process based on a direction operation performed by the user with the main device. When a transition is made from an attachment state where it is determined that the main device is attached to the certain type of the sub device to a non-attached state where it is determined that the main device is attached to none of the sub devices, the game process execution unit may determine, based on the device orientation information stored in the storage section in the attachment state, a relationship between a direction that is specified by the direction operation and content of a game process to be executed in response to the operation performed in the direction.

With configuration (15) above, the game system can execute the game process taking into consideration the orientation of the main device when the main device was in the attachment state before the transition to the non-attached state.

(16)

The detected portion of at least one of the sub devices may include a first portion and a second portion. The information processing program may cause the computer to further function as a recognition unit. The recognition unit is configured to recognize the first portion and recognize the second portion based on the captured image. The determination unit may determines the type of the sub device to which the main device is attached based on at least one of a position, a shape and an orientation of a first portion image representing the first portion. As a state of the main device attached to the sub device, the determination unit may determine a first state where the first portion is recognized and the second portion is not recognized, and a second state where the first portion and the second portion are recognized.

With configuration (16) above, the game system can estimate the degree to which the main device is attached to the sub device.

(17)

The game process execution unit may execute a first game process when it is determined that the main device is in the first state, and execute a second game process different from the first game process when it is determined that the main device is in the second state.

With configuration (17) above, different game processes are executed when in the first state and when in the second state, thus producing different game results (e.g., different game images are displayed), and the game system can therefore make the user recognize the degree to which the main device is attached to the sub device.

(18)

The detected portion of at least one of the sub devices may include a first portion and a second portion. The information processing program may cause the computer to further function as a recognition unit. The recognition unit is configured to recognize the first portion and recognize the second portion based on the captured image. The determination unit may determine the type of the sub device to which the main device is attached based on at least one of a position, a shape and an orientation of a first portion image representing the first portion. The determination unit may determine a degree to which the main device is attached to the sub device based on a recognition result of the first portion and a recognition result of the second portion.

With configuration (18) above, the game system may estimate the degree to which the main device is attached to the sub device.

(19)

The game process execution unit may execute a game process depending on the degree to which the main device is attached to the sub device.

With configuration (19) above, different game processes are executed depending on the degree to which the main device is attached to the sub device (e.g., different images are displayed depending on the degree of attachment), and the game system can therefore make the user recognize the degree to which the main device is attached to the sub device.

(20)

At least one of the sub devices may further include a movable portion that moves in accordance with an operation performed by the user. As the movable portion is moved in accordance with an operation performed by the user, a relative position between the main device attached to the sub device including the movable portion and the detected portion of the sub device may change. The game process execution unit may detect a first-type operation of the user based on at least one of a position, a shape and an orientation of a first portion image representing the first portion, and execute a game process based on the detected first-type operation. The game process execution unit may detect a second-type operation of the user based on at least one of a position, a shape and an orientation of a second portion image representing the second portion, and execute a game process based on the detected second-type operation.

With configuration (20) above, even when it is determined to be the first state (e.g., the main device is attached halfway through the sub device), the user can perform some game operations. Thus, the game system can improve the operability when performing operations using the sub device.

Note that the present specification discloses an information processing apparatus and an information processing system including the various units of any of configurations (1) to (20) above. The present specification also discloses an information processing method to be executed on an information processing apparatus (or an information processing system) of any of configurations (1) to (20) above.

With the information processing program, the information processing system, the information processing device and the information processing method, it is possible to improve the playability of a game application in which accessory devices (i.e., sub devices) are used.

These and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a diagram showing an example of a method for setting a front direction of a non-limiting right controller when a transition is made from the second attached state to the non-attached state;

FIG. 26 is a diagram showing an example of a case of a partially-recognized state and a case of a fully-recognized state;

FIG. 27 is a diagram showing an example of various data used in information processes performed on a non-limiting game system;

FIG. 29 is a sub flow chart showing an example of a detailed flow of an attachment state determining process of step S2 shown in FIG. 28.

DETAILED DESCRIPTION OF NON-LIMITING EXAMPLE EMBODIMENTS

Figure 1:
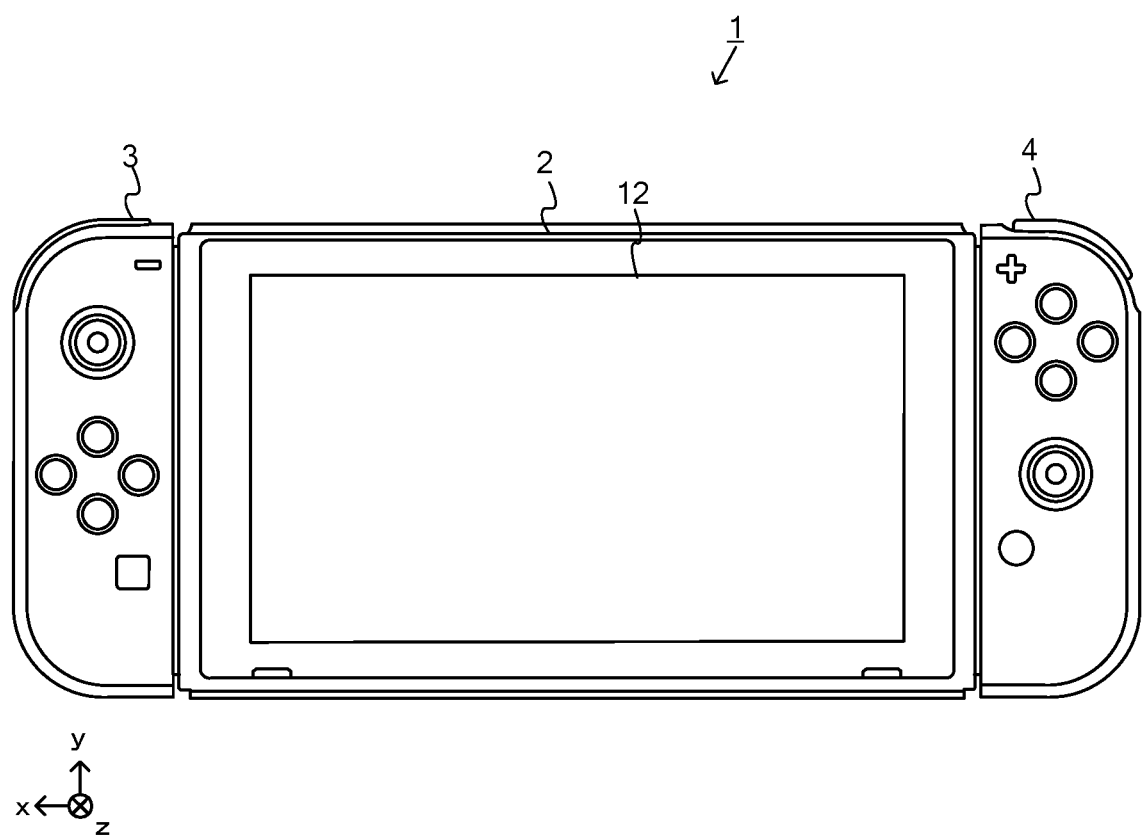
FIG. 1 is a diagram showing an example state where a non-limiting left controller and a non-limiting right controller are attached to a non-limiting main body apparatus.

[1. Hardware Configuration of Main Body Apparatus and Various Controllers]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Note that although the details will be described later, the game system 1 includes attachments to which the controller 3 or 4 can be attached. Hereinafter, first, the hardware configuration of the main body apparatus 2 and the controllers 3 and 4 is described, and then, the configuration of the attachments and the processes of the game system 1 when the attachments are used are described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
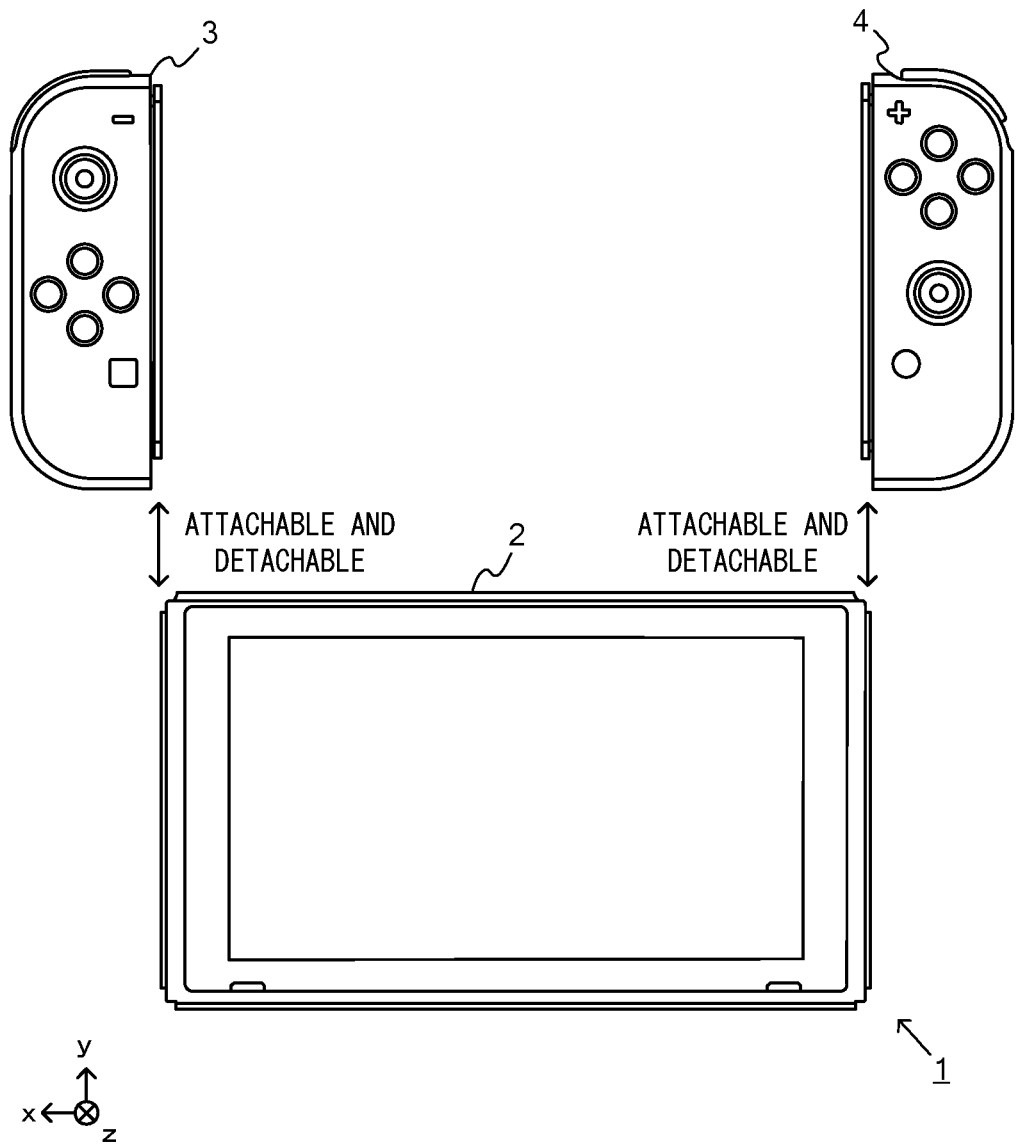
FIG. 2 is a diagram showing an example state where a non-limiting left controller and a non-limiting right controller are detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
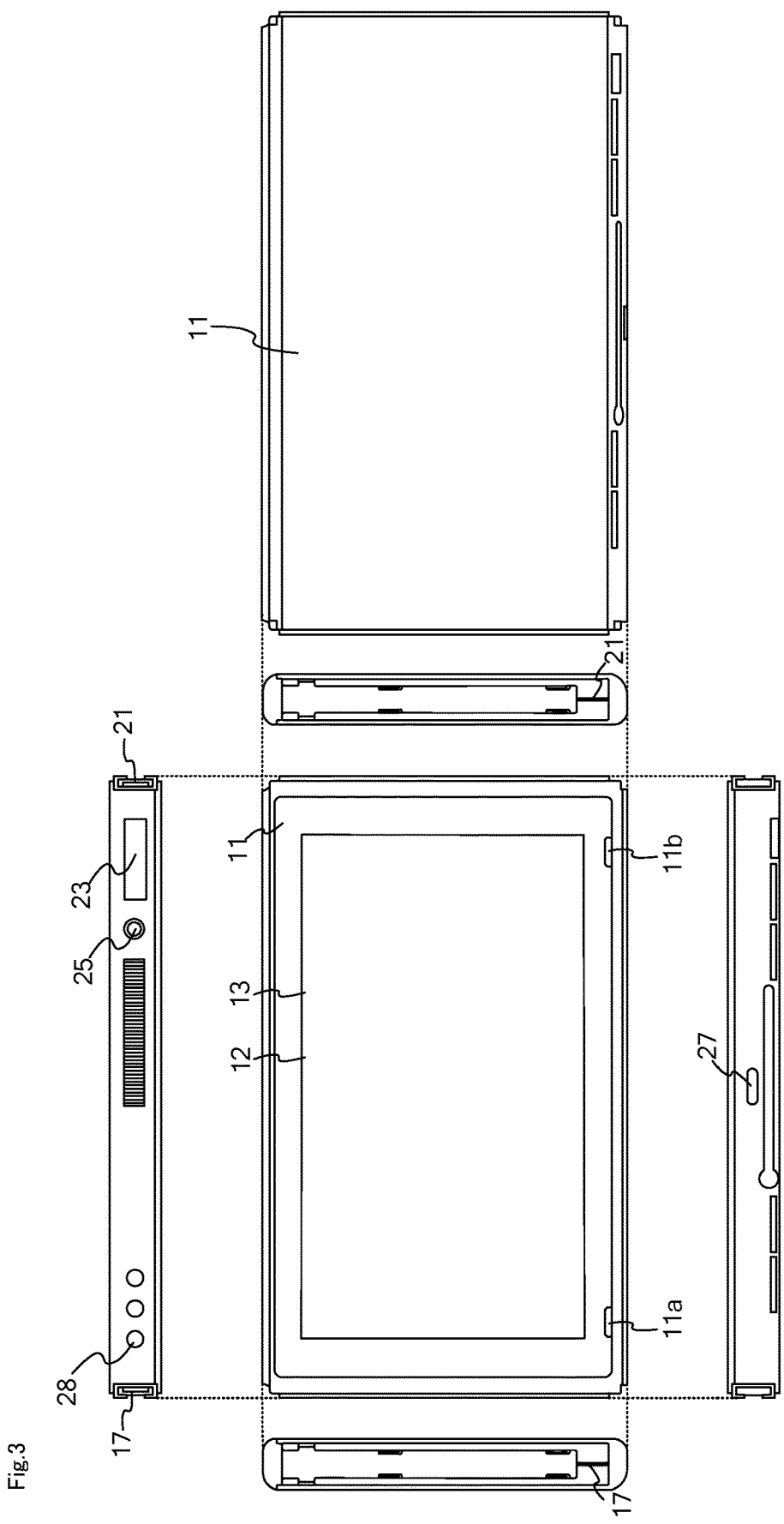
FIG. 3 shows six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
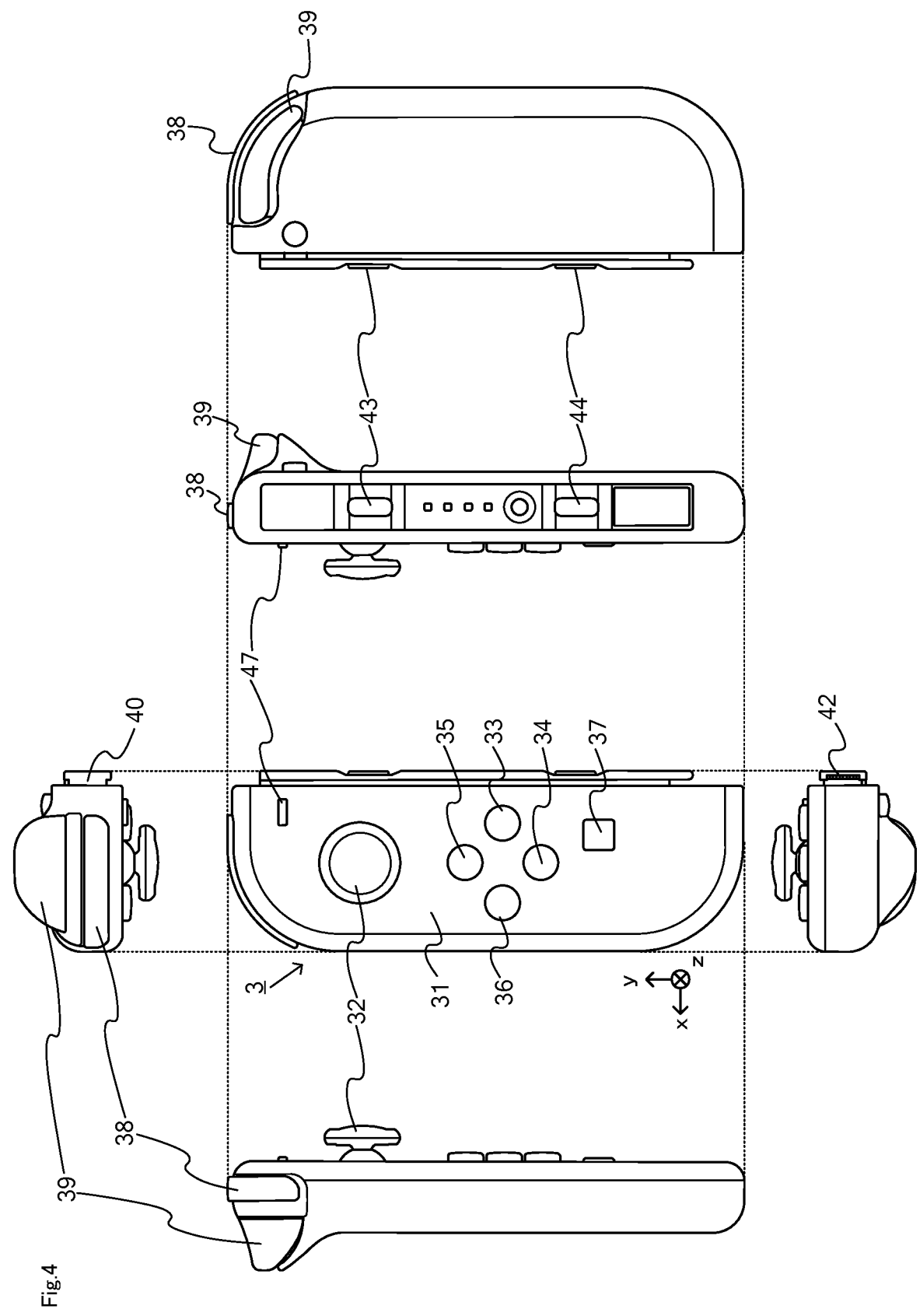
FIG. 4 shows six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
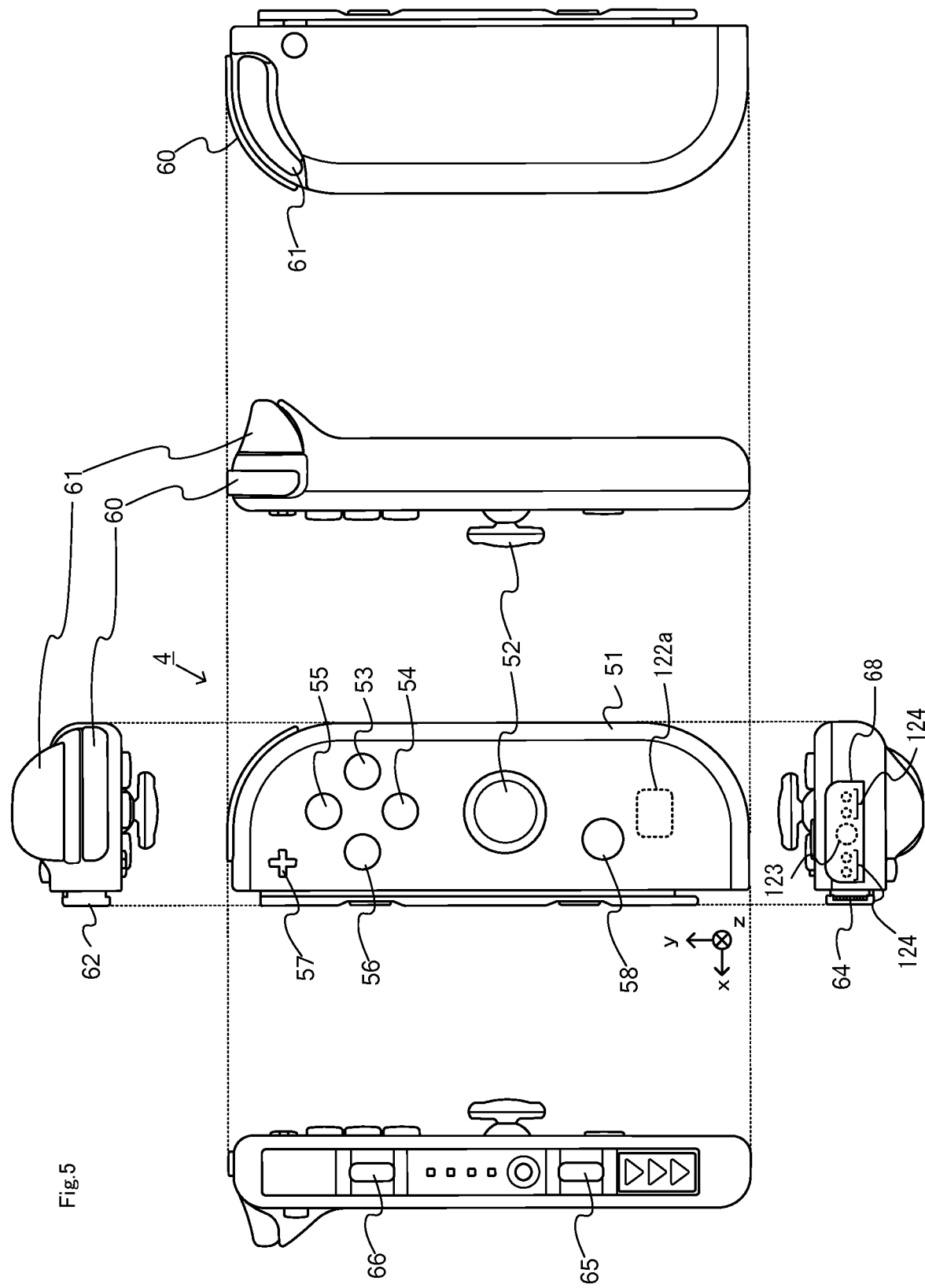
FIG. 5 shows six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through a window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

Figure 6:
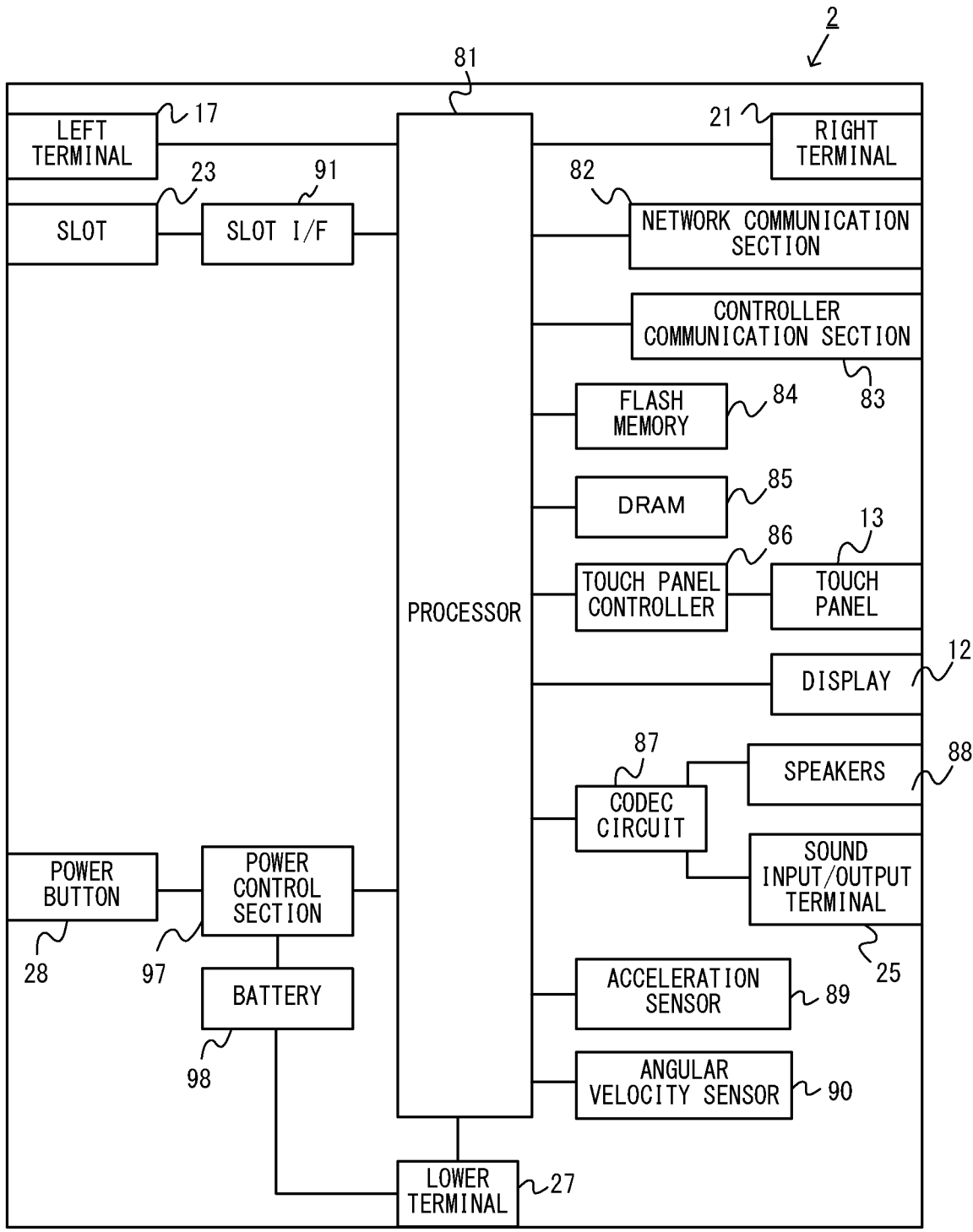
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
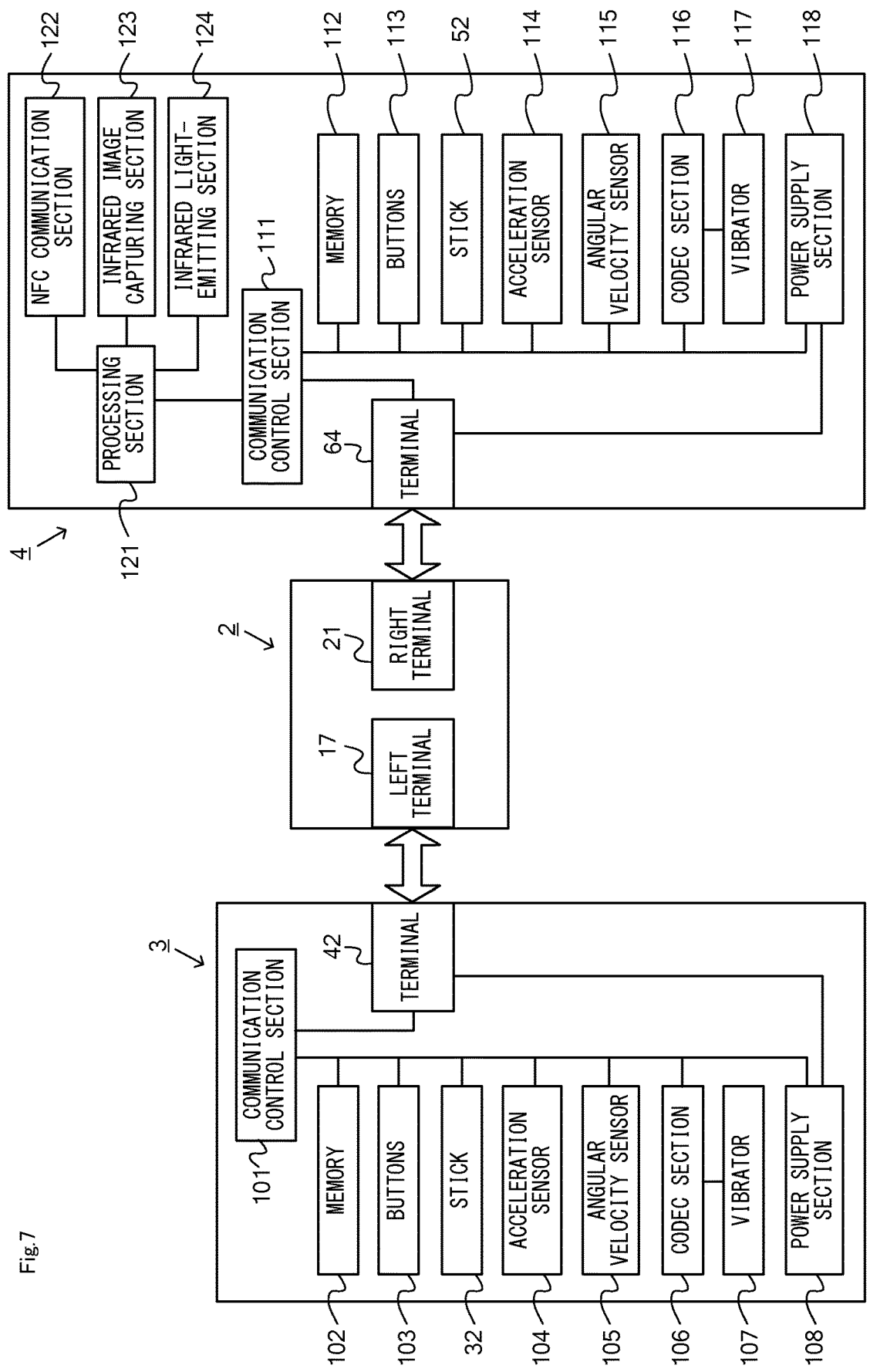
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122a). The other device can operate by the developed electromotive force, and may or may not have a power supply. When the right controller 4 (the antenna 122a) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

[2. Summary of Attachments and Game Processes Using the Same]

In the present embodiment, the game system 1 includes a plurality of types (herein, three types) of accessory controller devices, as peripheral devices for use with the main body apparatus 2 and the controllers 3 and 4 described above. The accessory controller devices are each a peripheral device to which a controller is attached. Note that a controller (herein, the right controller 4) is detachably attached to an accessory controller device. Although the details will be described later, in the present embodiment, the user (in other words, the player) attaches a controller to an accessory controller device, and performs game operations using the accessory controller device to which the controller is attached. Thus, in the present embodiment, game operations are performed by using the sub device to which the main device is attached, wherein the controller is the main device and the accessory controller device is the sub device.

Figure 8:
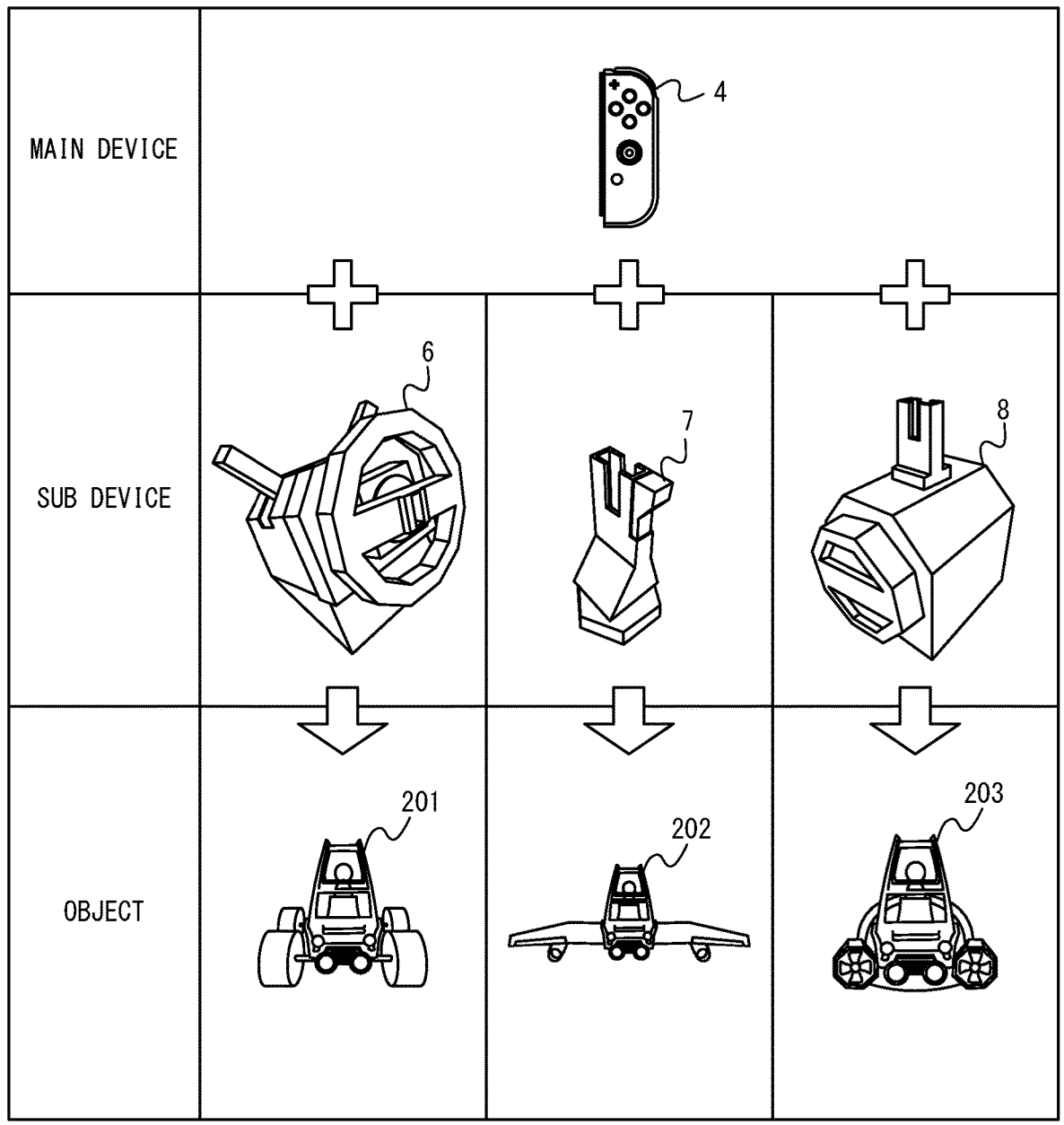
FIG. 8 is a diagram showing the relationship between combinations of a non-limiting controller and a non-limiting accessory controller device and an object to be the controlled object.

In the present embodiment, the game system 1 includes three types of accessory controller devices (specifically, first to third accessory controller devices 6 to 8 shown in FIG. 8). Note that in other embodiments, the number of accessory controller devices included in the game system 1 may be any number that is greater than or equal to two.

In the present embodiment, the user plays the game by using a plurality of (herein, three types of) accessory controller devices while the one game application is being executed. Note that while there is no limitation on the content of the game to be executed by the game application, it is in the present embodiment a game in which a player character controlled by the user is capable of moving around through the game space by operating various vehicles. While the game application is being executed (more specifically, while the game is being played), the user can change the accessory controller device to which the controller is attached from one to another. The game system 1 executes a different game process depending on the type of the accessory controller device to which the controller is attached. Although the details will be described later, in the present embodiment, the vehicle object to be operated by the player character changes in accordance with the accessory controller device to which the controller is attached. That is, in the present embodiment, the object to be operated by the user changes depending on the type of the accessory controller device to which the controller is attached.

FIG. 8 is a diagram showing the relationship between combinations of the controller and the accessory controller device and the object to be the controlled object. As shown in FIG. 8, in the present embodiment, the right controller 4 can be attached to any of the first to third accessory controller devices 6 to 8.

In the present embodiment, the right controller 4 is used as the controller to be attached to the accessory controller device. This is because in the present embodiment, the type of the accessory controller device to which the right controller 4 is determined based on the image-capturing result obtained by the infrared image capturing section 123 of the right controller 4. Note that the details of the method for determining the type of the accessory controller device will be described later.

As shown in FIG. 8, in the state (hereinafter referred to as the "first attachment state") in which the right controller 4 is attached to the first accessory controller device 6, an automobile object 201 to be operated by the player character appears in the game space. When the right controller 4 is in the first attachment state, the user operates the automobile object 201 by using the first accessory controller device 6 to which the right controller 4 is attached. That is, when the game system 1 determines that the right controller 4 is attached to the first accessory controller device 6, the player character and the automobile object 201 are placed in the game space. Then, the game system 1 controls the action of the automobile object 201 based on the operation performed with the first accessory controller device 6 to which the right controller 4 is attached.

As shown in FIG. 8, in the state (hereinafter referred to as the "second attachment state") in which the right controller 4 is attached to the second accessory controller device 7, an airplane object 202 to be operated by the player character appears in the game space. When the right controller 4 is in the second attached state, the user operates the airplane object 202 by using the second accessory controller device 7 to which the right controller 4 is attached. That is, when the game system 1 determines that the right controller 4 is attached to the second accessory controller device 7, the player character and the airplane object 202 are placed in the game space. Then, the game system 1 controls the action of the airplane object 202 based on the operation performed with the second accessory controller device 7 to which the right controller 4 is attached.

As shown in FIG. 8, in the state (hereinafter referred to as the "third attachment state") in which the right controller 4 is attached to the third accessory controller device 8, a boat object 203 to be operated by the player character appears in the game space. When the right controller 4 is in the third attachment state, the user operates the boat object 203 by using the third accessory controller device 8 to which the right controller 4 is attached. That is, when the game system 1 determines that the right controller 4 is attached to the third accessory controller device 8, the player character and the boat object 203 are placed in the game space. Then, the game system 1 controls the action of the boat object 203 based on the operation performed with the third accessory controller device 8 to which the right controller 4 is attached.

Although not shown in the figures, in the state (hereinafter referred to as the "non-attached state") in which the right controller 4 is attached to none of the accessory controller devices, the player character does not ride on a vehicle object. When the right controller 4 is in the non-attached state, the player controls the player character that is not riding on a vehicle object. That is, when the game system 1 determines that the right controller 4 is attached to none of the accessory controller devices, the player character that is not riding on a vehicle object is placed in the game space. Then, the game system 1 controls the action of the player character based on the operation performed with the right controller 4. Note that in other embodiments, the game system 1 may not allow the user to control the player character (in other words, to perform operations using the right controller 4) in the non-attached state.

In the present embodiment, even if the attachment state of the right controller 4 changes, the game system 1 can execute processes for progressing the game (in other words, game processes) without being discontinued. That is, the game system 1 progresses the game seamlessly even if there is a change to the attachment state of the right controller 4. For example, when the user attempts to re-attach the right controller 4, which is currently attached to the first accessory controller device 6, to the second accessory controller device 7, the attachment state of the right controller 4 transitions from the first attachment state, to the non-attached state and then to the second attached state. In such a case, the game system 1 continuously executes processes for progressing the game without discontinuing the game (e.g., without temporarily stopping the process upon detecting the non-attached state). That is, during the period in which the attachment state of the right controller 4 transitions from the first attachment state to the second attached state through the non-attached state, the game system 1 continuously accepts operations by the user and continuously executes game processes in accordance with the operations. Thus, in the present embodiment, since the game progresses even during the period in which the user changes the attachment state of the right controller 4, the user can recognize the operation of attaching the right controller 4 to an accessory controller device as if it were a part of the game operation. Thus, it is possible to present, to the user, a novel gaming experience in which the user performs game operations while switching between accessory controller devices to which the right controller 4 is attached during gameplay.

Note that in other embodiments, the game system 1 may temporarily stop the process for progressing the game in response to the right controller 4 entering the non-attached state. Then, the game system 1 may resume the process for progressing the game in response to the right controller 4 being attached to any accessory controller device.

In other embodiments, where the vehicle object switches from one to another in response to a change to the attachment state of the right controller 4, the game system 1 may ask the user to confirm the switching of the vehicle object. For example, in such a case, the game system 1 may display a message "Switch vehicle object?", and accept an instruction input to confirm the switch. Note that the game may or may not be paused in this process.

As described above, in the present embodiment, the user can switch the object to be the controlled object by switching the attachment state of the right controller 4 during the game. Therefore, according to the present embodiment, it is possible to present, to the user, a novel gaming experience in which the user plays the game while switching the accessory controller device to which the controller is attached depending on circumstances in the game, and it is therefore possible to provide a game with high playability.

The configurations of the accessory controller devices 6 to 8 and the processes to be executed when the right controller 4 is attached to the accessory controller devices 6 to 8 will now be described for each of the accessory controller devices.

[2-1. First Accessory Controller Device]

[2-1-1. Configuration of First Accessory Controller Device]

Figure 9:
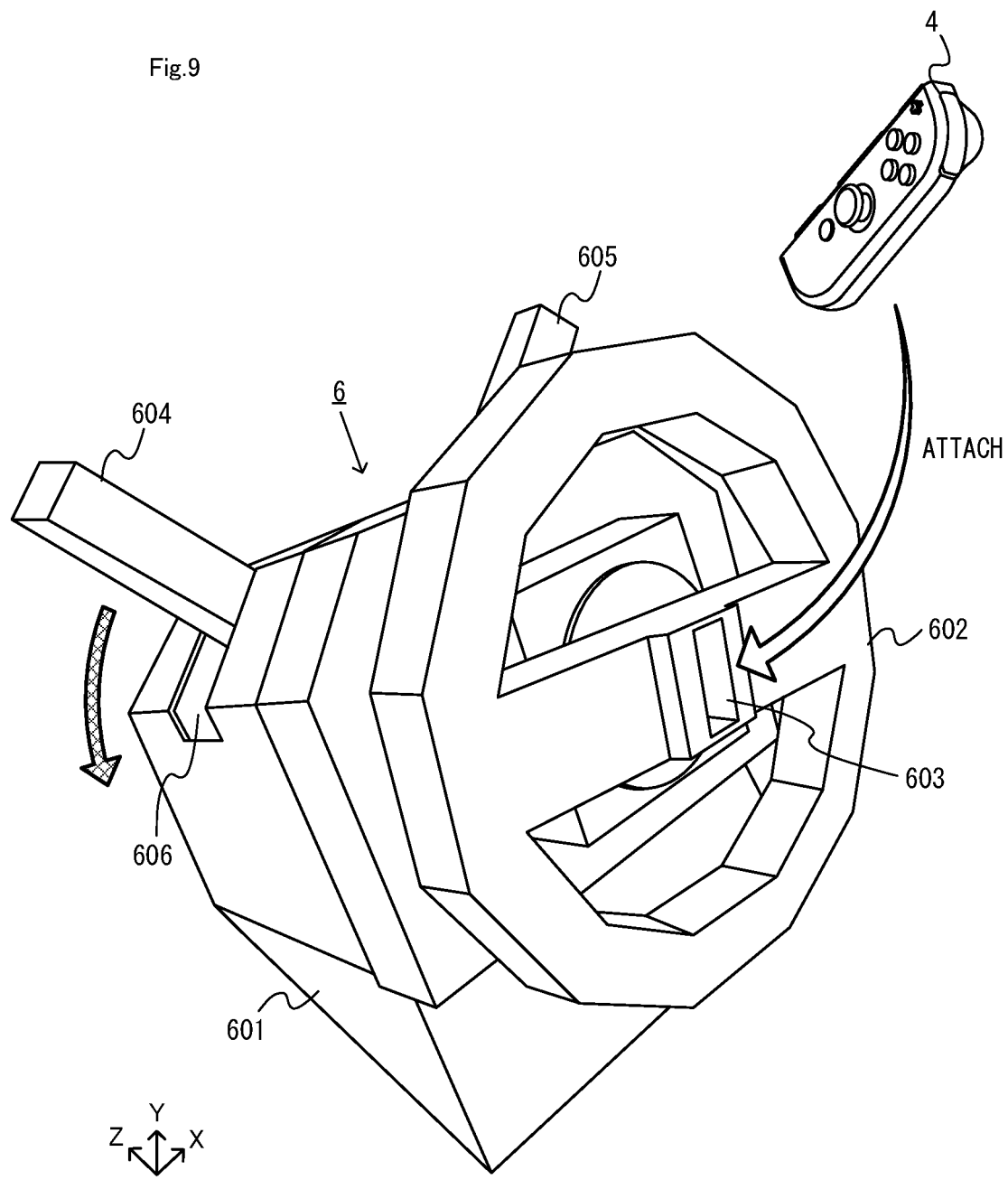
FIG. 9 is a diagram showing an example of a non-limiting first accessory controller device and a non-limiting right controller.
Figure 10:
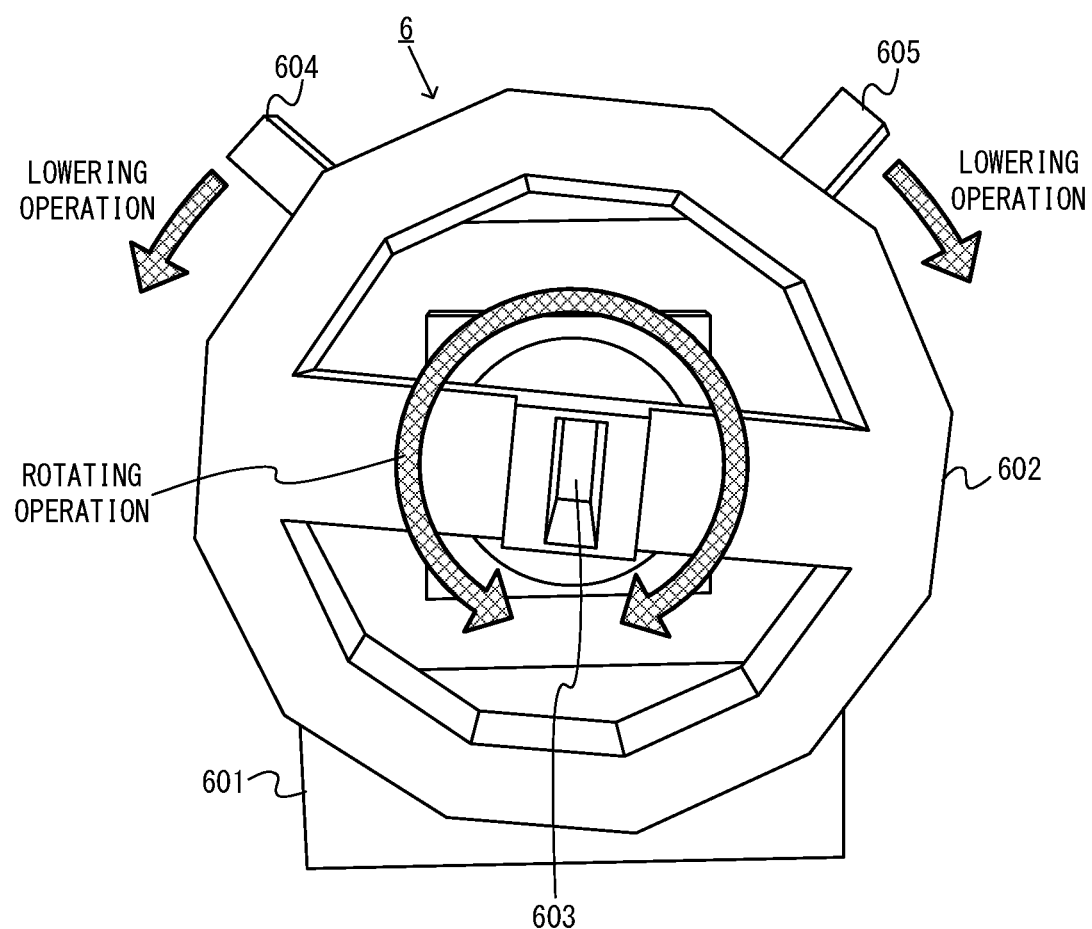
FIG. 10 is a diagram showing the first accessory controller device shown in FIG. 9 as seen from the front side.

Referring to FIG. 9 to FIG. 16, the first accessory controller device 6 and the game process for when the right controller 4 is attached to the first accessory controller device 6 will be described. FIG. 9 is a diagram showing an example of the first accessory controller device and the right controller. FIG. 10 is a diagram showing the first accessory controller device shown in FIG. 9 from the front side (i.e., the Z-axis negative direction side shown in FIG. 9).

As shown in FIG. 9, the first accessory controller device 6 includes a housing 601, a steering wheel 602, a left lever 604 and a right lever 605. The first accessory controller device 6 is a controller device, of which the steering wheel 602 and the levers 604 and 605 can be operated. The first accessory controller device 6 is a controller device that imitates a steering wheel of an automobile, and is a controller device for controlling the automobile object 201 by using the steering wheel 602 and the levers 604 and 605.

While there is no limitation on the material of the accessory controller devices 6 to 8, the material of the components of the accessory controller devices 6 to 8 (excluding the markers to be described below) is corrugated cardboard in the present embodiment. The accessory controller devices 6 to 8 may be presented to the user in an unassembled form so that the user can assemble the accessory controller devices 6 to 8. Using corrugated cardboard as the material of the accessory controller devices 6 to 8, it is possible to manufacture the accessory controller devices at low cost. By allowing the user to assemble the accessory controller devices, it is possible to give the user the joy of assembling the controller devices to be used in the game.

The steering wheel 602 shown in FIG. 9 is connected to the front surface (i.e., the surface on the Z-axis negative direction side) of the housing 601. The steering wheel 602 is rotatably connected to the housing 601. Specifically, the steering wheel 602 includes a ring-shaped portion having a ring shape, and a shaft portion extending between opposite positions along the ring-shaped portion while passing through the center of the ring-shaped portion. The steering wheel 602 is rotatable relative to the housing 601 about the center of the ring-shaped portion or the vicinity thereof being the rotation axis. With such a configuration, the user can perform an operation of rotating the steering wheel 602 (hereinafter referred to as the "rotating operation") (FIG. 10).

In the present embodiment, the shaft portion is provided with an insertion hole 603 at the position of the rotation axis of the steering wheel 602. The insertion hole 603 extends along the rotation axis (in other words, along the direction perpendicular to the rotation surface of the steering wheel). The insertion hole 603 is provided for the attachment of the right controller 4. That is, the right controller 4 is attached to the first accessory controller device 6 by inserting the right controller 4 into the insertion hole 603 as shown in FIG. 9. Note that in the present embodiment, the user can correctly attach the right controller 4 to the first accessory controller device 6 by inserting the right controller 4 into the insertion hole 603 from the lower side of the right controller 4 (i.e., the side on which the window portion 68 of the infrared image capturing section 123 is provided). Although not shown in the figures, a bottom surface is provided at the end of the insertion hole 603 of the shaft portion so that the right controller 4 inserted into the insertion hole 603 comes into contact with the bottom surface. Therefore, the right controller 4 inserted into the insertion hole 603 stops by contacting the bottom surface when inserted to a certain depth.

Note that although not shown in the figures, the bottom surface provided at the end of the insertion hole 603 has a hole therein that is located so as to oppose the window portion 68 of the right controller 4 attached to the first accessory controller device 6. Therefore, the infrared image capturing section 123 of the right controller 4 attached to the first accessory controller device 6 can capture an image of the inside of the housing 601 through the hole in the bottom surface.

The levers 604 and 605 shown in FIG. 9 each protrude from a side surface of the housing 601. Specifically, the left lever 604 is provided on an upper left side surface of the housing 601 (i.e., on the X-axis negative direction side and the Y-axis positive direction side shown in FIG. 9). The right lever 605 is provided on an upper right side surface of the housing 601 (i.e., on the X-axis positive direction side and the Y-axis positive direction side shown in FIG. 9). The levers 604 and 605 are each connected movably in the up-down direction with respect to the housing 601. The detailed configuration of the levers 604 and 605 will now be described.

Figure 11:
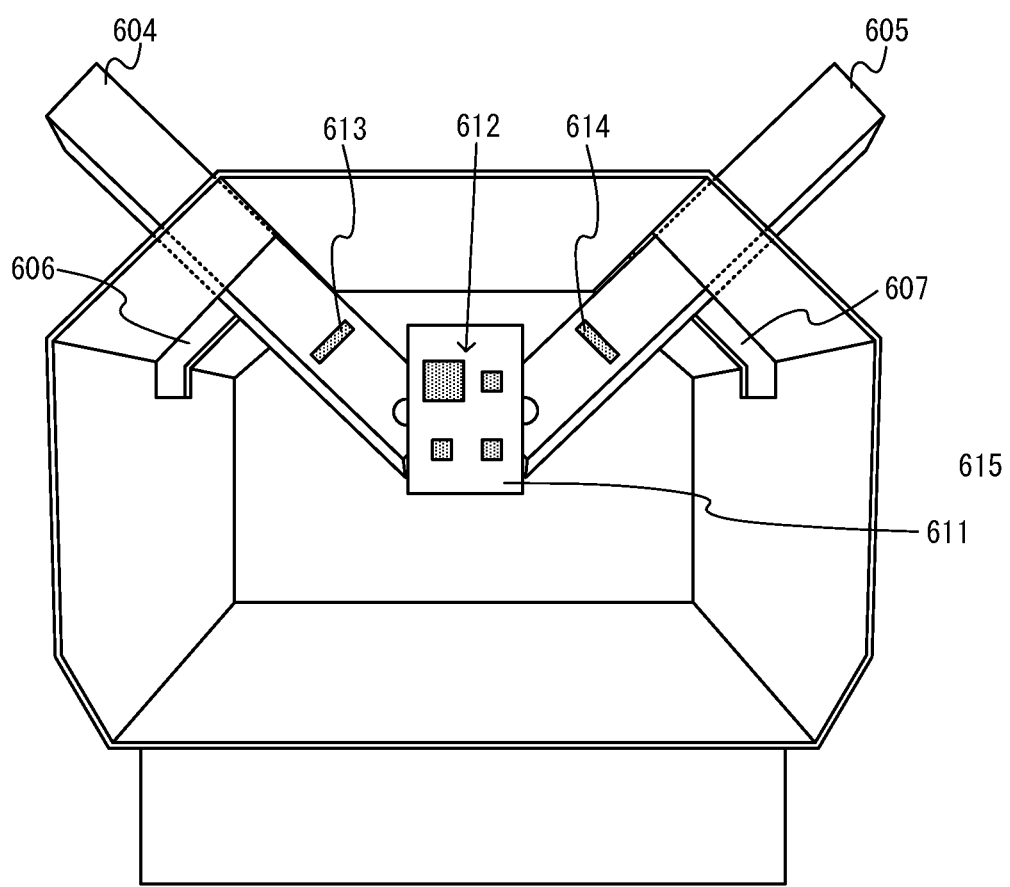
FIG. 11 is a diagram showing an example of an internal configuration of a housing.

FIG. 11 is a diagram showing an example of an internal configuration of the housing 601. Note that FIG. 11 is a diagram showing the inside of the housing 601, with the front-side surface of the housing 601 (i.e., the surface to which the steering wheel 602 is connected) removed. As shown in FIG. 9 and FIG. 11, a left lever hole 606 is provided on the upper left side surface of the housing 601. A right lever hole 607 is provided on the upper right side surface of the housing 601. Herein, each of the levers 604 and 605 is a bar-shaped member. As shown in FIG. 11, one end of the left lever 604 is connected to the inside of the housing 601 so that it can pivot relative to the housing 601, with the other end of the left lever 604 projecting out of the housing 601 through the left lever hole 606. As shown in FIG. 11, one end of the right lever 605 is connected to the inside of the housing 601 so that it can pivot relative to the housing 601, with the other end of the right lever 605 projecting out of the housing 601 through the right lever hole 607. Note that the orientations of the pivot axes of the levers 604 and 605 are substantially the same as (in other words, parallel to) the orientation of the pivot axis of the steering wheel 602.

The left lever hole 606 is sized so as to allow the left lever 604 to pivot (in other words, allow the end portion of the left lever 604 projecting out of the housing 601 to move in the up-down direction). The right lever hole 607 is sized so as to allow the right lever 605 to pivot (in other words, allow the end portion of the right lever 605 projecting out of the housing 601 to move in the up-down direction). Each of the levers 604 and 605 is biased by a biasing member (not shown) so that the end portion thereof that is projecting out of the housing 601 is urged upward. Therefore, while the user is making no operation, the levers 604 and 605 rest on the upper edge of the lever holes 606 and 607, as shown in FIG. 9 and FIG. 11. With the configuration described above, the user can perform an operation of lowering the levers 604 and 605 (hereinafter referred to as the "lowering operation") (FIG. 10).

[2-1-2. Process Performed Based on Marker]

In the present embodiment, a marker of which an image can be captured by the infrared image capturing section 123 of the right controller 4 is provided inside each of the accessory controller devices 6 to 8. In the present embodiment, the game system 1 uses the infrared image capturing section 123 of the right controller 4 attached to an accessory controller device to capture the image of the marker and detect the marker from the captured image. Then, based on the marker detection results, the game system 1 determines the type of the accessory controller device and determines the operation performed with the accessory controller device (specifically, a rotating operation and a lowering operation in the case of the first accessory controller device 6). The details of the determination process using a marker will now be described.

As shown in FIG. 11, inside the housing 601, an image-captured surface 611 is provided at a position such that an image thereof can be captured by the infrared image capturing section 123 of the right controller 4 attached to the first accessory controller device 6 (in other words, in the image-capturing range of the infrared image capturing section 123). A first basic marker 612 is provided on the image-captured surface 611. Note that in the present specification, a marker used for determining the type of the accessory controller device to which the right controller 4 is attached is referred to as a "basic marker". The first basic marker 612 is a basic marker provided in the first accessory controller device 6, and is used for determining that the right controller 4 is attached to the first accessory controller device 6.

Herein, a marker is of a material (and/or a color) such that the infrared image capturing section 123 can distinguish the marker from other portions (i.e., portions other than the marker) of the wall surface inside the housing of the accessory controller device. A marker may be a shape, a design, or a combination thereof, drawn on the inner surface of the housing, or may be a component attached to the inner surface of the housing. A marker may be of a material having a retroreflective property, for example. Then, more infrared light from the infrared light-emitting section 124 is reflected toward the infrared image capturing section 123, and it is therefore easier for the infrared image capturing section 123 to recognize a marker. It is also easier to recognize a marker that is farther away from the infrared image capturing section 123. Alternatively, the infrared light-emitting section 124 may be provided inside the housing as a marker, instead of a retroreflective material.

In the present embodiment, the first basic marker 612 has a shape composed of four square portions (FIG. 11). Although the details will be described later, the basic markers provided on the accessory controller devices 6 to 8 have different shapes from each other. In the example shown in FIG. 11, the first basic marker 612 has one square portion that is larger than the other three square portions. Thus, when a basic marker is detected from the captured image from the infrared image capturing section 123 of the right controller 4, the game system 1 can determine the type of the accessory controller device to which the right controller 4 is attached based on the shape of the detected basic marker. For example, when the first basic marker 612 is detected from the captured image, the game system 1 can determine that the right controller 4 is attached to the first accessory controller device 6. Note that in the present specification, the "shape of a marker" is a concept including the size of the marker. That is, it can be said that two markers having different sizes from each other have different shapes.

Figure 12:
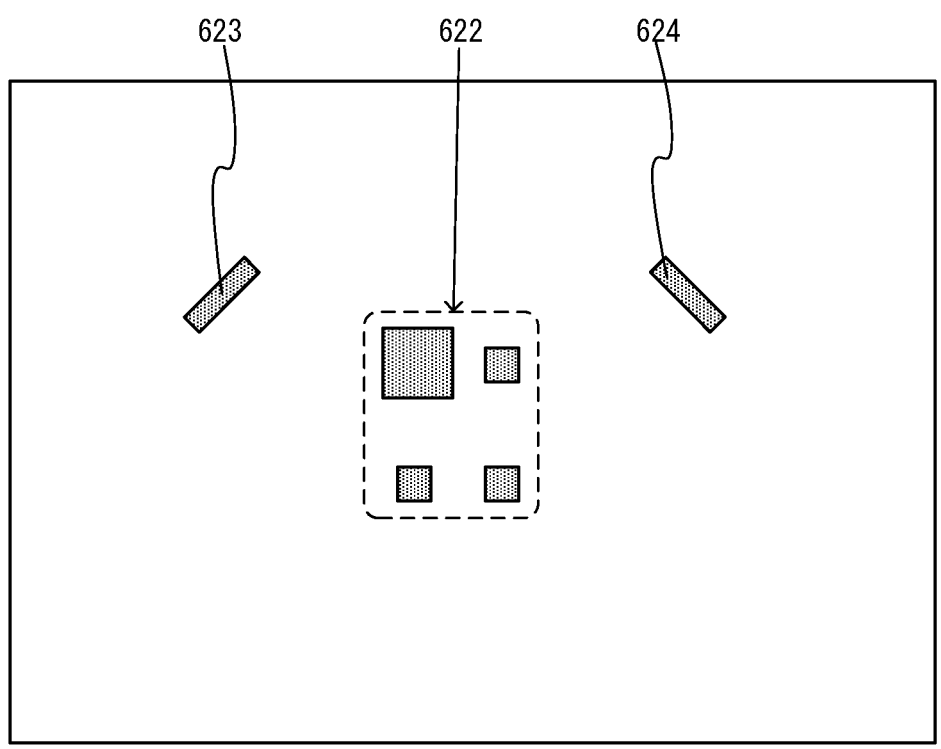
FIG. 12 is a diagram showing an example of a captured image that is captured by an infrared image capturing section when the steering wheel of a non-limiting first accessory controller device is in a reference state.
Figure 13:
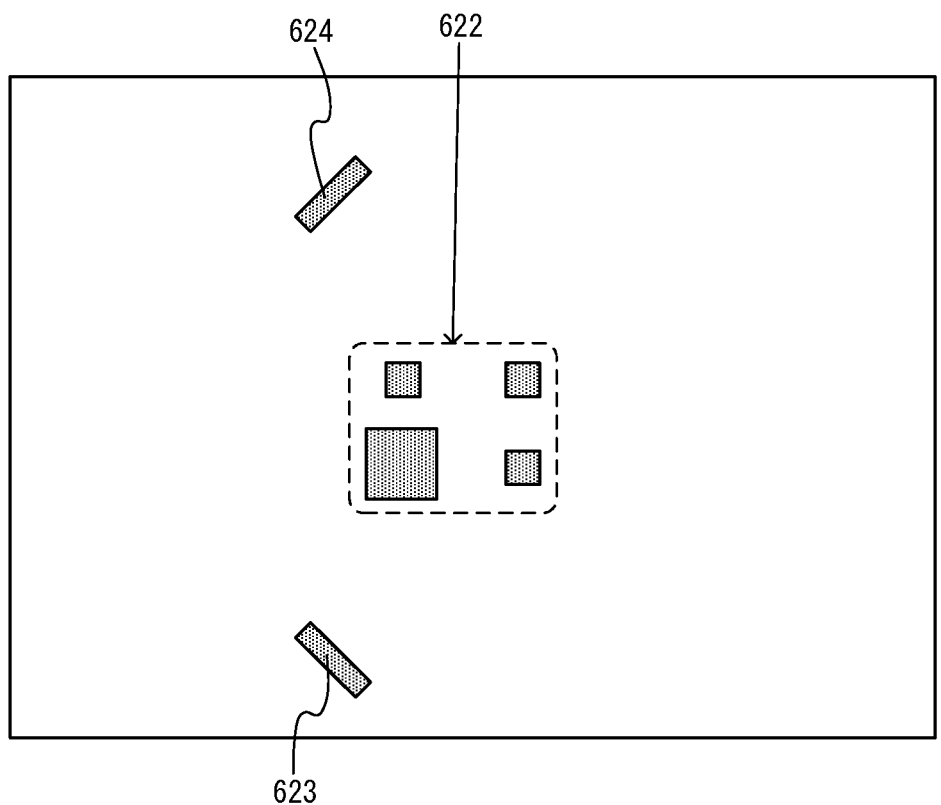
FIG. 13 is a diagram showing an example of a captured image that is captured by the infrared image capturing section when the steering wheel of a non-limiting first accessory controller device is rotated from the reference state.

In the present embodiment, the first basic marker 612 is used for detecting a rotating operation performed with the steering wheel 602. Referring to FIG. 12 and FIG. 13, the method for detecting a rotating operation will be described.

FIG. 12 is a diagram showing an example of a captured image that is captured by the infrared image capturing section 123 when the steering wheel 602 of the first accessory controller device 6 is in a reference state (specifically, a state where the shaft portion is horizontal). FIG. 13 is a diagram showing an example of a captured image that is captured by the infrared image capturing section 123 when the steering wheel 602 of the first accessory controller device 6 is rotated from the reference state. A first basic marker image 622 shown in FIG. 12 and FIG. 13 is an image of the first basic marker 612 on the captured image.

When the steering wheel 602 rotates through a rotating operation, the right controller 4 attached to the steering wheel 602 also rotates. Therefore, the orientation of the first basic marker image 622 included in the captured image changes in accordance with the rotation angle of the steering wheel 602. Therefore, the game system 1 can calculate the rotation angle of the steering wheel 602 based on the orientation of the first basic marker image 622 on the captured image, and detect a rotating operation based on the rotation angle. Specifically, the game system 1 detects whether or not a rotating operation has been performed and/or the amount of rotation of the rotating operation. For example, in the example shown in FIG. 12 and FIG. 13, the first basic marker image 622 shown in FIG. 13 is rotated left by 90° relative to the first basic marker image 622 shown in FIG. 12. Therefore, when the captured image shown in FIG. 13 is obtained from the right controller 4, the game system 1 can determine that the steering wheel 602 is rotated right by 90° from the reference state.

As described above, the basic marker used for determining the type of the accessory controller device to which the right controller 4 is attached may also be used for detecting an operation performed with the accessory controller device.

As shown in FIG. 11, a left lever marker 613 is provided at such a position on the left lever 604 inside the housing 601 that the image thereof can be captured by the infrared image capturing section 123 of the right controller 4 attached to the first accessory controller device 6. The left lever marker 613 is used for detecting an operation performed with the left lever 604. Referring to FIG. 11, FIG. 12, FIG. 14 and FIG. 15, a method for detecting a rotating operation will now be described.

Figure 14:
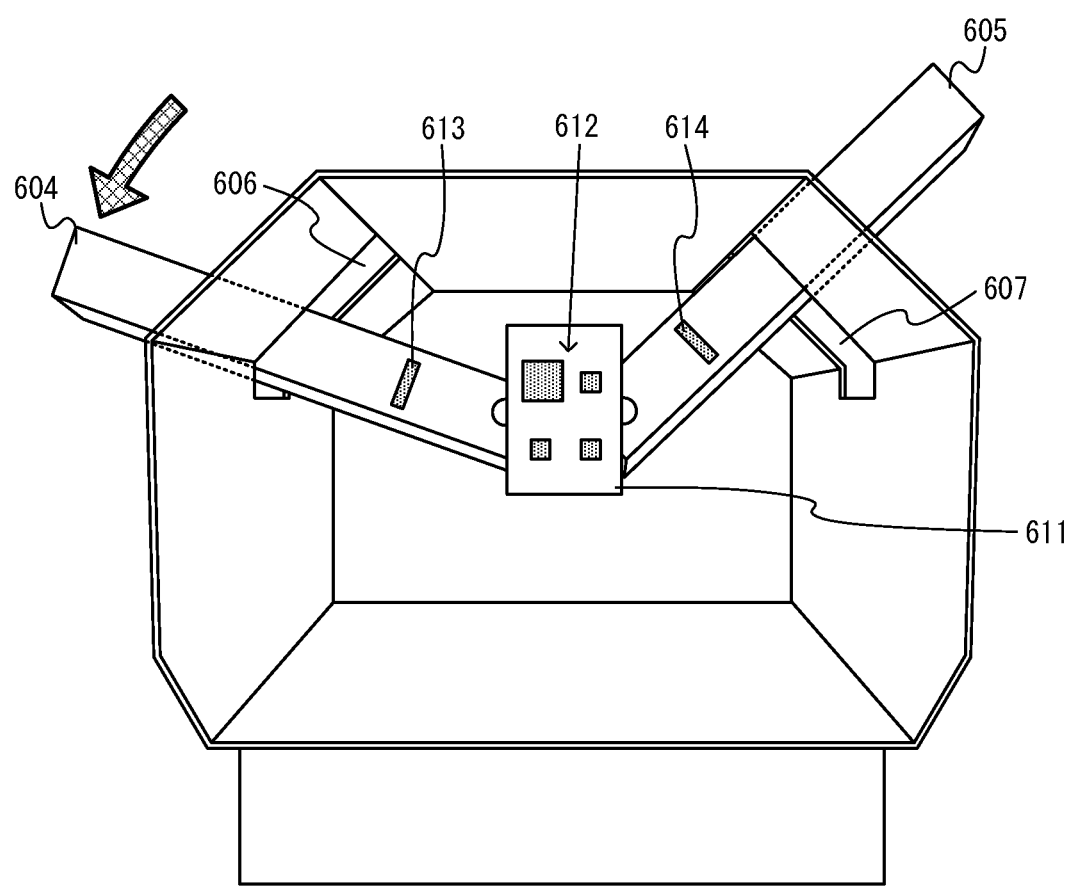
FIG. 14 is a diagram showing an example of a non-limiting first accessory controller device where a lowering operation has been performed with the left lever.
Figure 15:
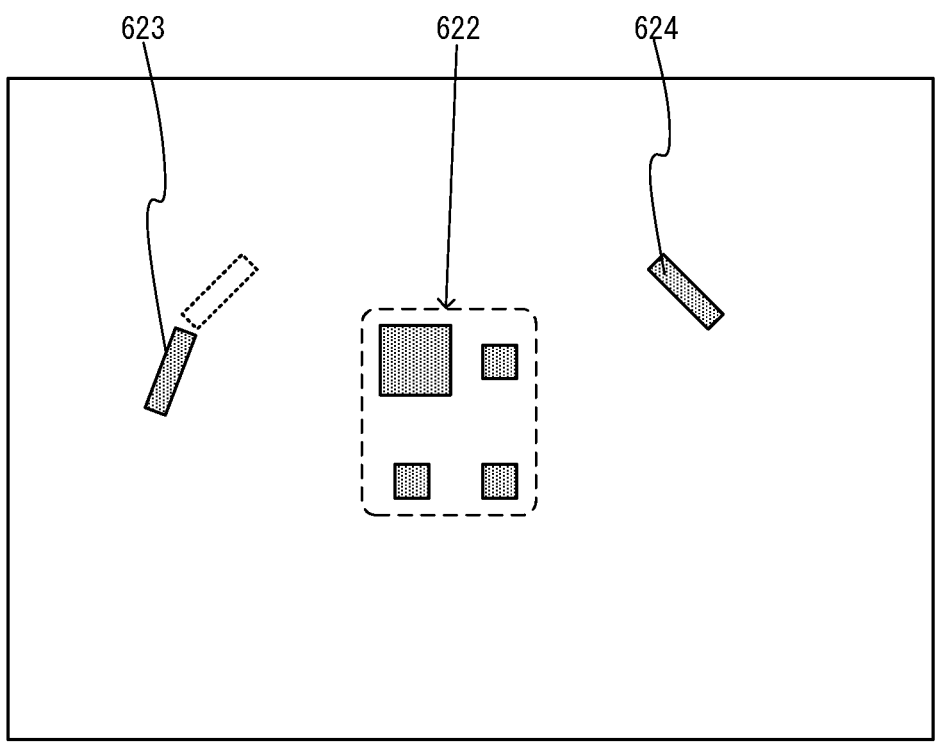
FIG. 15 is a diagram showing an example of a captured image captured by the infrared image capturing section when a lowering operation has been performed with the left lever.

FIG. 14 is a diagram showing an example of the first accessory controller device 6 where a lowering operation has been performed with the left lever 604. FIG. 15 is a diagram showing an example of a captured image that is captured by the infrared image capturing section 123 when a lowering operation has been performed with the left lever 604. Note that FIG. 11 discussed above is a diagram showing an example of the first accessory controller device 6 where a lowering operation has not been performed with the left lever 604, and FIG. 12 shows an example of a captured image that is captured by the infrared image capturing section 123 in such a state. Note that a left lever marker image 623 shown in FIG. 12 and FIG. 15 is an image of the left lever marker 613 on the captured image.

When the left lever 604 is moved downward in a lowering operation, the position and the orientation of the left lever marker 613 as seen from the infrared image capturing section 123 of the right controller 4 attached to the first accessory controller device 6 change from those when a lowering operation has not been performed with the left lever 604. Therefore, the position and the orientation of the left lever marker image 623 on the captured image vary between when a lowering operation has not been performed with the left lever 604 (FIG. 12) and when a lowering operation has been performed (FIG. 15). Specifically, the position of the left lever marker image 623 when a lowering operation has been performed with the left lever 604 has moved in the lower left direction relative to the position of the left lever marker image 623 when a lowering operation has not been performed with the left lever 604. Therefore, when the captured image shown in FIG. 15 is obtained from the right controller 4, the game system 1 can determine that a lowering operation has been performed with the left lever 604.

Note that in the present embodiment, the right controller 4 attached to the first accessory controller device 6 rotates following the rotation of the steering wheel 602. Thus, as the position and the orientation of the left lever marker image 623 on the captured image, the game system 1 calculates the position and the orientation of the left lever marker image 623 relative to the first basic marker image 622, and detects a lowering operation performed with the left lever 604 based on the calculated position and the orientation.

As shown in FIG. 11, a right lever marker 614 is provided at such a position on the right lever 605 inside the housing 601. The right lever marker 614 is used for detecting an operation performed with the right lever 605. The detection of a lowering operation performed with the right lever 605 can be done similarly to the detection of a lowering operation performed with the left lever 604. That is, the game system 1 calculates the position and the orientation of a right lever marker image 624 on the captured image (specifically, the position and the orientation relative to the first basic marker image 622), and detects a lowering operation performed with the right lever 605 based on the calculated position and the orientation.

[2-1-3. Game Process Performed when Right Controller 4 is Attached to First Accessory Controller Device 6]

Figure 16:
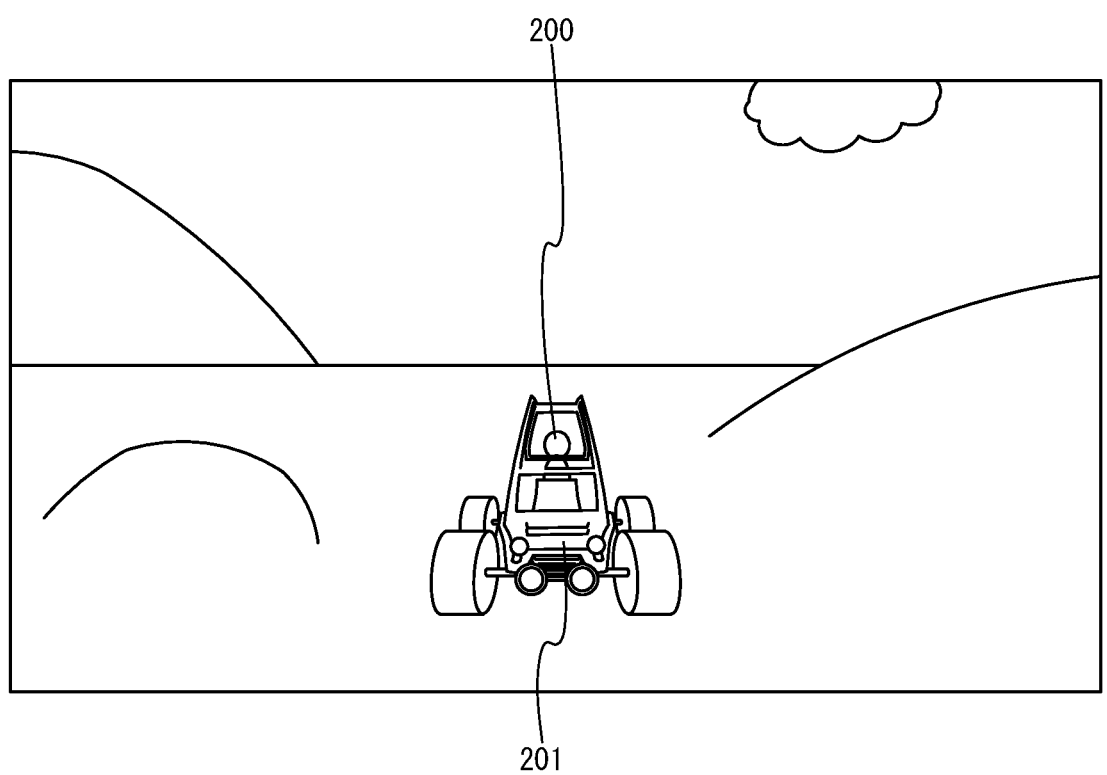
FIG. 16 is a diagram showing an example of a game image to be displayed when a non-limiting right controller is attached to a non-limiting first accessory controller device.

FIG. 16 is a diagram showing an example of a game image to be displayed when the right controller 4 is attached to the first accessory controller device 6. When the right controller 4 is attached to the first accessory controller device 6, the game system 1 determines that the right controller 4 is attached to the first accessory controller device 6 based on the captured image obtained from the infrared image capturing section 123 of the right controller 4. Then, the game system 1 displays, on a display device, a game image that shows a player character 200 riding on the automobile object 201, as shown in FIG. 16. Note that in the present embodiment, the display device on which the game image is displayed may be the display 12 described above or may be the stationary monitor described above.

When it is determined that the right controller 4 is attached to the first accessory controller device 6, the game system 1 detects operations performed with the first accessory controller device 6 (specifically, a rotating operation and a lowering operation), and controls the action of the automobile object 201 in response to these operations performed by the user. Note that there is no limitation on the method for controlling the action of the automobile object 201 in accordance with the operation by the user. For example, in the present embodiment, the game system 1 controls the direction of travel of the automobile object 201 in accordance with a rotating operation performed with the steering wheel 602. Moreover, the game system 1 changes the gear of the automobile object 201 in accordance with a lowering operation performed with the left lever 604, and fires a bullet from the automobile object 201 in accordance with a lowering operation performed with the right lever 605.

Thus, by attaching the right controller 4 to the first accessory controller device 6, the user can make the automobile object 201 appear in the game space and can play a game in which the user controls the automobile object 201.

[2-2. Second Accessory Controller Device]

[2-2-1. Configuration of Second Accessory Controller Device]

Figure 17:
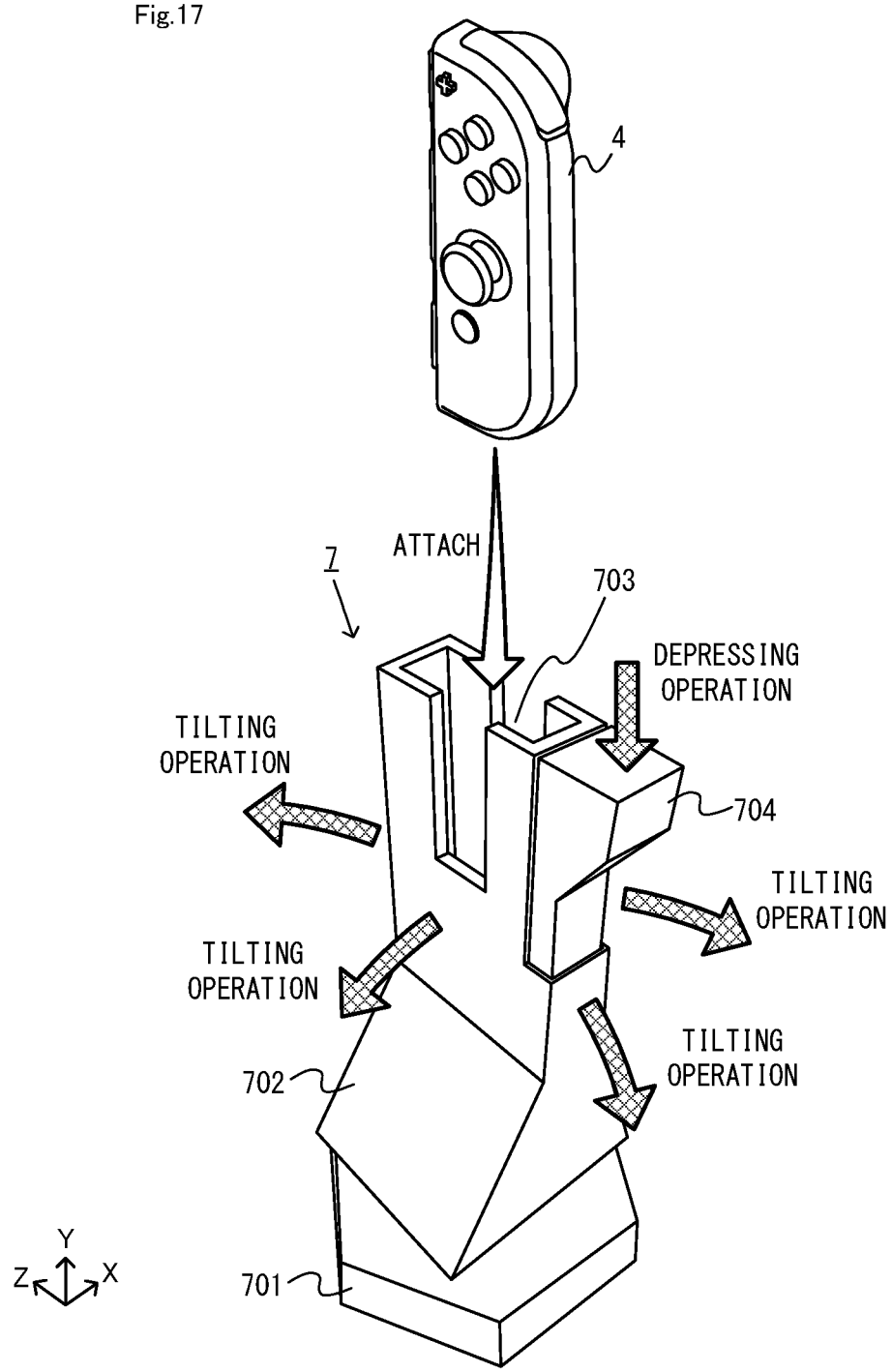
FIG. 17 is a diagram showing an example of a non-limiting second accessory controller device and a non-limiting right controller.
Figure 18:
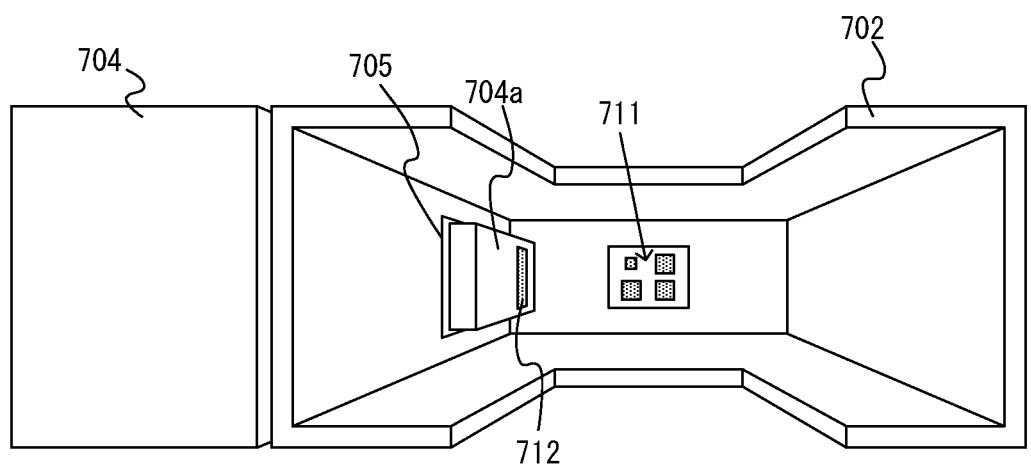
FIG. 18 is a diagram showing the second accessory controller device shown in FIG. 17 as seen from above.

Referring to FIG. 17 to FIG. 22, the second accessory controller device 7 and the game process for when the right controller 4 is attached to the second accessory controller device 7 will be described. FIG. 17 is a diagram showing an example of the second accessory controller device and the right controller. FIG. 18 is a diagram showing the second accessory controller device 7 shown in FIG. 17 from the upper side (i.e., the Y-axis positive direction side shown in FIG. 17).

As shown in FIG. 17, the second accessory controller device 7 includes a base portion 701, a handle portion 702 and a button 704. The second accessory controller device 7 is a controller device of which the handle portion 702 and the button 704 can be operated. The second accessory controller device 7 is a controller device that imitates a control stick of an airplane, and is a controller device for controlling the airplane object 202 by using the handle portion 702 that looks like a control stick.

With the second accessory controller device 7 shown in FIG. 17, the handle portion 702 is connected to the base portion 701. The handle portion 702 can be tilted relative to the base portion 701. Note that while FIG. 17 shows arrows in four directions (front, rear, left and right) each representing a tilt direction of the handle portion 702, the handle portion 702 can be tilted in any direction from the reference state in which the longitudinal direction of the handle portion 702 is equal to the vertical direction.

As shown in FIG. 17, the handle portion 702 has an insertion hole 703 on the upper surface thereof. The insertion hole 703 extends along the longitudinal direction of the handle portion 702. The insertion hole 703 is provided for the attachment of the right controller 4. That is, the right controller 4 is attached to the second accessory controller device 7 by inserting the right controller 4 into the insertion hole 703 as shown in FIG. 17. Note that in the present embodiment, the user can correctly insert the right controller 4 into the second accessory controller device 7 by inserting the right controller 4 into the insertion hole 703 from the lower side of the right controller 4. As described above, an upper portion of the handle portion 702 is formed in a tubular shape, and the right controller 4 can be inserted into the inside of the tubular portion. As shown in FIG. 17, a groove is provided on the side surface of the tubular portion. When the right controller 4 is inserted into the handle portion 702, the analog stick 52 is inserted along the groove, and the insertion of the right controller 4 into the handle portion 702 is stopped as the analog stick 52 comes into contact with the bottom of the groove.

As shown in FIG. 18, the insertion hole 703 of the handle portion 702 is connected to the cavity inside the handle portion 702. Therefore, the infrared image capturing section 123 of the right controller 4 inserted into the insertion hole 703 and attached to the handle portion 702 can capture the image of the inside of the handle portion 702.

As shown in FIG. 17, the button 704 is provided on the handle portion 702, specifically, on the side surface of the tubular portion of the handle portion 702. The button 704 can be depressed from above. Note that as shown in FIG. 18, a hole 705 is provided on one side surface of the tubular portion of the handle portion 702 where the button 704 is provided. A portion of the button 704 projects through the hole 705 (FIG. 18). Therefore, the infrared image capturing section 123 of the right controller 4 attached to the second accessory controller device 7 can capture the image of the portion of the button 704.

With the configuration above, the user can perform an operation of tilting the handle portion 702 (hereinafter referred to as the "tilting operation"), and an operation of depressing the button 704 (hereinafter referred to as the "depressing operation") (FIG. 17).

[2-2-2. Process Performed Based on Marker]

With the second accessory controller device 7, as with the first accessory controller device 6, a marker of which an image can be captured by the infrared image capturing section 123 is provided inside the accessory controller device. The game system 1 detects a marker from the captured image obtained from the infrared image capturing section 123 of the right controller 4 attached to the second accessory controller device 7. Then, based on the marker detection results, the game system 1 detects the attachment of the right controller 4 to the second accessory controller device 7 and detects an operation performed with the second accessory controller device 7 (specifically, a depressing operation).

As shown in FIG. 18, a second basic marker 711 is provided on the bottom surface inside the handle portion 702 at such a position that an image thereof can be captured by the infrared image capturing section 123 of the right controller 4 attached to the second accessory controller device 7. While there is no limitation on the shape of the second basic marker 711, the shape of the second basic marker 711 is different from that of the first basic marker 612 described above and that of a third basic marker 811 to be described below. In the example shown in FIG. 18, the second basic marker 711 has four square portions, one of which is smaller than the other three.

With the second accessory controller device 7, as with the first accessory controller device 6, the game system 1 uses the basic marker to determine the type of the accessory controller device to which the right controller 4 is attached. That is, when the second basic marker 711 is detected on the captured image obtained from the right controller 4, the game system 1 determines that the right controller 4 is attached to the second accessory controller device 7.

As shown in FIG. 18, a button marker 712 is provided at such a position on the button 704 that an image thereof can be captured by the infrared image capturing section 123 of the right controller 4 attached to the second accessory controller device 7. Specifically, the button marker 712 is provided on a portion of the button 704 that projects through the hole 705 of the handle portion 702. The button marker 712 is used to detect a depressing operation performed with the button 704.

Figure 19:
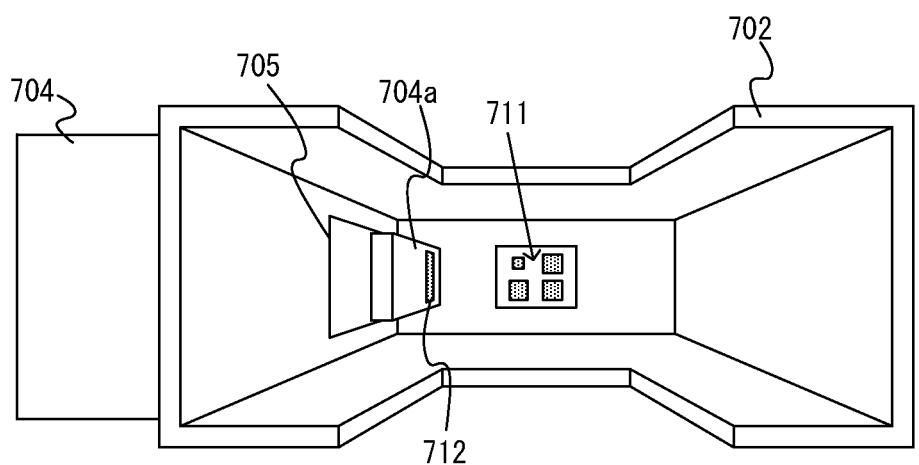
FIG. 19 is a diagram showing an example of the inside of a handle portion when a button of the handle portion is depressed.

FIG. 19 is a diagram showing an example of the inside of the handle portion when the button of the handle portion is depressed. Note that FIG. 18 is a diagram showing an example of the inside of the handle portion when the button of the handle portion is not depressed. The position of the button marker 712 as seen from the infrared image capturing section 123 of the right controller 4 attached to the first accessory controller device 6 varies between when the button 704 of the handle portion 702 is not depressed (FIG. 18) and when the button 704 of the handle portion 702 is depressed (FIG. 19). Specifically, the position of the button marker 712 when the button 704 is depressed moves in the right direction (in other words, toward the second basic marker 711) from the position of the button marker 712 when the button 704 is not depressed. Therefore, the game system 1 can detect an operation performed with the button 704 based on the position of the image of the button marker 712 on the captured image that is captured by the infrared image capturing section 123 of the right controller 4 attached to the second accessory controller device 7.

A tilting operation performed with the handle portion 702 is detected based on the detection results of the acceleration sensor of the right controller 4. That is, the game system 1 calculates the attitude of the right controller 4 based on the acceleration detected by the acceleration sensor 89 of the right controller 4. Then, based on the calculated attitude, the game system 1 calculates the direction in which and the amount by which the right controller 4 and the handle portion 702 are tilted relative to the reference state described above. Thus, the game system 1 can detect a tilting operation performed with the handle portion 702.

As described above, the game system 1 may detect an operation performed with an accessory controller device by using a marker or by using operation data from the right controller 4 attached to the accessory controller device. The game system 1 may detect an operation performed with the accessory controller device by using both the marker and the operation data.

[2-2-3. Game Process Performed when Marker is Detected]

Figure 20:
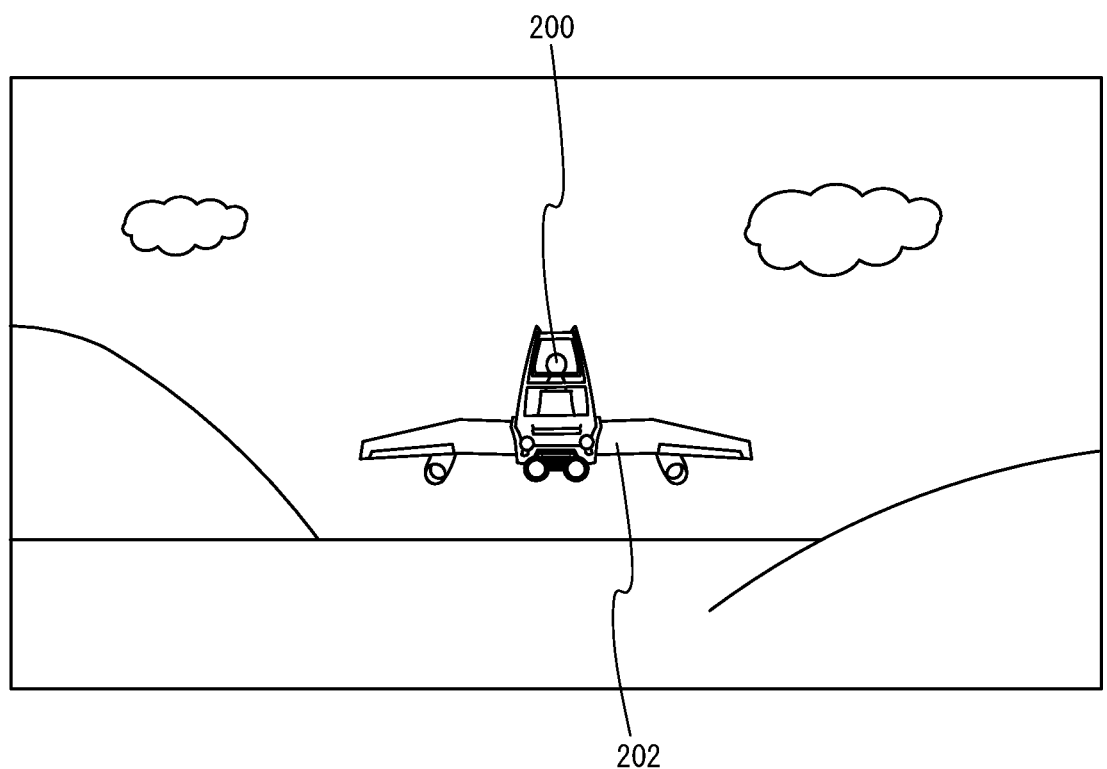
FIG. 20 is a diagram showing a game image to be displayed when a non-limiting right controller is attached to a non-limiting second accessory controller device.

FIG. 20 is a diagram showing an example of a game image to be displayed when the right controller 4 is attached to the second accessory controller device 7. When the right controller 4 is attached to the second accessory controller device 7, the game system 1 determines that the right controller 4 is attached to the second accessory controller device 7 based on the captured image obtained from the infrared image capturing section 123 of the right controller 4. Then, the game system 1 displays, on a display device, a game image that shows the player character 200 riding on the airplane object 202, as shown in FIG. 20.

When it is determined that the right controller 4 is attached to the second accessory controller device 7, the game system 1 detects various operations performed with the second accessory controller device 7 (specifically, a tilting operation and a depressing operation), and controls the action of the airplane object 202 in accordance with these operations performed by the user. Note that there is no limitation on the method for controlling the action of the airplane object 202 in accordance with the operation by the user. For example, in the present embodiment, the game system 1 controls the direction of travel of the airplane object 202 in accordance with the tilting operation performed with the handle portion 702. The game system 1 fires a bullet from the airplane object 202 in accordance with a depressing operation performed with the button 704.

Thus, by attaching the right controller 4 to the second accessory controller device 7, the user can make the airplane object 202 appear in the game space and play the game in which the user controls the airplane object 202.

[2-2-4. Process Performed Upon Transition from Second Attached State to Non-Attached State]

As described above, while playing the game of the game application, when the right controller 4 is attached to none of the accessory controller devices, the player character 200 appears to be in the game space not riding on a vehicle object. Note that when no basic marker is detected from the captured image obtained from the right controller 4, the game system 1 determines that the right controller 4 is attached to none of the accessory controller devices.

Herein, in the present embodiment, when the attachment state of the right controller 4 transitions from the second attached state to the non-attached state, the player character 200 changes from riding on the airplane object 202 to wearing a parachute.

Figure 21:
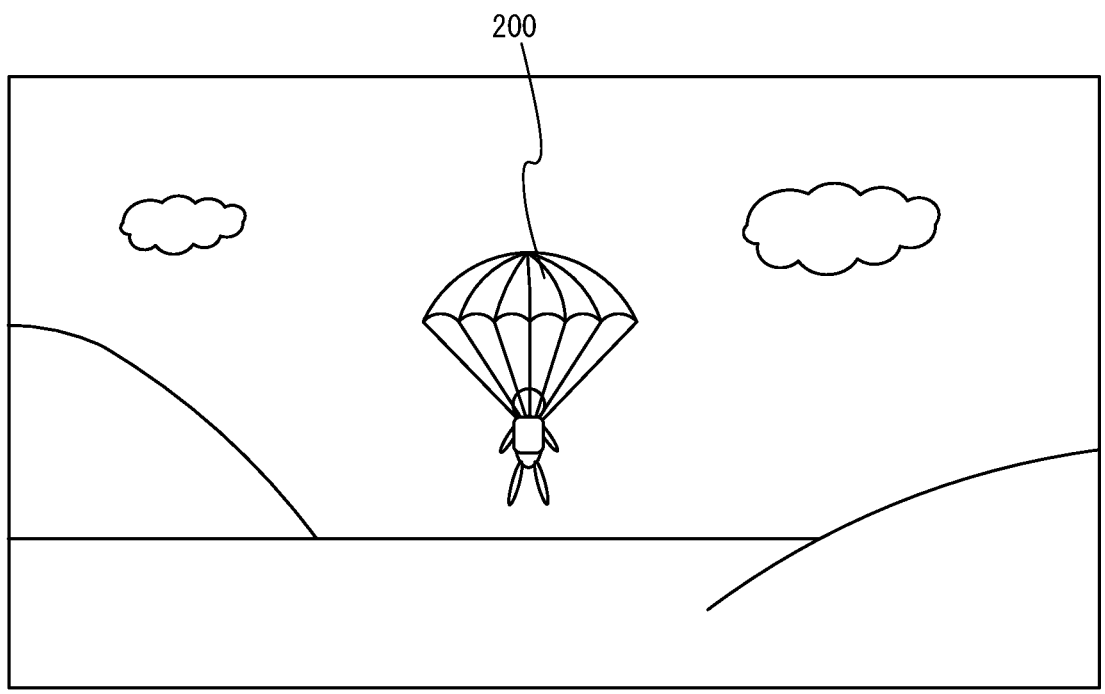
FIG. 21 is a diagram showing an example of a game image to be displayed when a transition is made from the second attached state to the non-attached state.

FIG. 21 is a diagram showing an example of a game image to be displayed when a transition is made from the second attached state to the non-attached state. When the attachment state of the right controller 4 transitions from the second attached state to the non-attached state, the player character 200 appears to be in the sky not riding on the airplane object 202 but slowly falling down to the ground wearing a parachute as shown in FIG. 21. Note that after landing on the ground, the player character 200 can move around on the ground in accordance with operations performed with the right controller 4.

With the player character 200 wearing a parachute, the user can control action of the player character 200 by operating the right controller 4. Specifically, the game system 1 controls the direction of fall of the player character 200 so that the player character 200 falls in a direction in accordance with the attitude of the right controller 4. For example, the player character 200 falls while moving forward in the game space in accordance with an operation of tilting the right controller 4 forward relative to the reference state, and the player character 200 falls while moving right in the game space in accordance with an operation of tilting the right controller 4 right relative to the reference state. Note that the reference state of the right controller 4 in the non-attached state is a state in which the up direction of the right controller 4 (i.e., the y-axis positive direction) is equal to the vertically upward direction. Note that the attitude in the reference state of the right controller 4 in the non-attached state is substantially the same as the attitude of the right controller 4 when the handle portion 702 is in the reference state in the second attached state.

As described above, in the present embodiment, with the player character 200 wearing a parachute, the player character 200 is controlled by an operation of tilting the right controller 4, as in a state where the player character 200 is riding on the airplane object 202.

Herein, for the detection of a game operation while the player character 200 is wearing a parachute (i.e., an operation of tilting the right controller 4), the game system 1 sets the front direction of the right controller 4 (in other words, determines which side surface of the right controller 4 is to be regarded as the front surface). Note that the process of setting the front direction of the right controller 4 can be said to be the process of setting the relationship between the direction of the operation performed by the user with the right controller 4 (herein, the direction in which the right controller 4 is tilted) and the content of the game process to be executed in response to the operation in that direction (herein, the direction of movement in the process of moving the player character). In the present embodiment, the game system 1 sets the front direction of the right controller 4 by the following method.

FIG. 22 is a diagram showing an example of a method for setting a front direction of the right controller 4 when a transition is made from the second attached state to the non-attached state. First, as shown in FIG. 22, the right controller 4 can be attached to the second accessory controller device 7 in two ways. That is, as for the mode of operation in which the user uses the right controller 4 and the second accessory controller device 7, there are two different modes of operation, i.e., a first mode of operation and a second mode of operation. The first mode of operation is a mode in which operations are performed while the right controller 4 is attached to the second accessory controller device 7 in a first orientation in which the main body-side surface of the right controller 4 is oriented in the front direction of the second accessory controller device 7 (i.e., the Z-axis positive direction shown in FIG. 17). The second mode of operation is a mode in which operations are performed while the right controller 4 is attached to the second accessory controller device 7 in a second orientation in which the main body-side surface of the right controller 4 is oriented in the rear direction of the second accessory controller device 7 (i.e., in the Z-axis negative direction shown in FIG. 17). Note that the "main body-side surface" refers to a surface of the right controller 4 that opposes the main body apparatus 2 when the right controller 4 is attached to the main body apparatus 2, and in other words is a surface on the x-axis positive direction side shown in FIG. 5.

In the present embodiment, the game system 1 stores the orientation in which the right controller 4 is attached to the second accessory controller device 7 in the second attached state (whether it is the first orientation or the second orientation, in other words, whether it is the first mode of operation or the second mode of operation). That is, the game system 1 stores orientation information representing the first orientation when operations are performed in the first mode of operation in the second attached state, and stores orientation information representing the second orientation when operations are performed in the second mode of operation in the second attached state.

When a transition is made from the second attached state to the non-attached state, the game system 1 sets the front direction of the right controller 4 in the non-attached state in accordance with the orientation information stored when the right controller 4 was in the second attached state. Specifically, when the stored orientation information represents the first orientation, the game system 1 sets the direction in which the main body-side surface is oriented (i.e., the x-axis positive direction shown in FIG. 5) as the front direction of the right controller 4. In this case, the game system 1 calculates the attitude of the right controller 4 and detects an operation of tilting the right controller 4 while assuming that the direction in which the main body-side surface is oriented is the front direction (see FIG. 22). Therefore, in such a case, the game system 1 detects an operation of tilting the right controller 4 in the front direction when the right controller 4 is tilted so that the main body-side surface tilts in the front direction. As a result, the player character 200 falls while moving in the front direction in the game space. That is, in such a case, the operation of tilting the right controller 4 so that the main body-side surface tilts in the front direction is regarded as an input that indicates the front direction whether in the second attached state or in the non-attached state.

On the other hand, in the non-attached state following the second attached state, when the stored orientation information represents the second orientation, the game system 1 sets the direction opposite to the direction in which the main body-side surface is oriented (i.e., the x-axis negative direction shown in FIG. 5) as the front direction of the right controller 4. In such a case, the game system 1 calculates the attitude of the right controller 4 and detects an operation of tilting the right controller 4 while assuming that the direction opposite to the direction in which the main body-side surface is oriented is the front direction (see FIG. 22). Therefore, in such a case, the game system 1 detects an operation of tilting the right controller 4 in the rear direction when the right controller 4 is tilted so that the main body-side surface tilts in the front direction. As a result, the player character 200 falls while moving in the rear direction in the game space. That is, in such a case, the operation of tilting the right controller 4 so that the main body-side surface tilts in the front direction is regarded as an input that indicates the rear direction whether in the second attached state or in the non-attached state.

As described above, in the present embodiment, where the right controller 4 is operated in the first mode of operation in the second attached state, tilting operations of the right controller 4 are detected in the subsequent non-attached state while assuming that the main body-side surface side is the front side. On the other hand, where the right controller 4 is operated in the second mode of operation in the second attached state, tilting operations of the right controller 4 are detected in the subsequent non-attached state while assuming that the main body-side surface side is the rear side. Therefore, according to the present embodiment, the user can perform game operations without changing the orientation of the right controller 4 in the second attached state and in the subsequent non-attached state. In other words, the user can indicate the same direction by tilting the right controller 4 in the same direction both in a tilting operation of the right controller 4 in the second attached state and in a tilting operation of the right controller 4 in the non-attached state. Thus, it is possible to improve the operability of the right controller 4 when a transition is made from the second attached state to the non-attached state.

As described above, in the present embodiment, when it is determined that the right controller 4 is attached to a certain accessory controller device (the second accessory controller device 7 in the present embodiment), the game system 1 stores orientation information regarding the orientation of the right controller relative to the certain accessory controller device. The game system 1 executes the game process based on a direction operation performed by the user with the right controller 4. Then, when a transition is made from the second attached state to the non-attached state, the game system 1 determines the relationship between the direction specified by the direction operation and the content of the game process to be executed in response to the operation performed in the direction (i.e., sets the front direction of the right controller 4) based on the orientation information stored when the right controller 4 was in the second attached state. Thus, by determining the relationship in the non-attached state while taking into consideration the orientation of the right controller 4 in the attachment state preceding the non-attached state, it is possible to improve the operability when performing operations in the non-attached state.

Note that in other embodiments, the direction operation performed with the right controller 4 in the non-attached state is not limited to the tilting operation as in the present embodiment, but may be any operation that is performed to specify the direction. For example, in other embodiments, the direction operation performed with the right controller 4 in the non-attached state may be an operation performed with an analog stick. That is, in the non-attached state, the game system 1 may control the direction in which the player character 200 falls in accordance with the operation performed with the analog stick. Specifically, if the orientation information stored when the right controller 4 was in the second attached state represents the first orientation, the game system 1 may detect an operation of tilting the analog stick 52 in the direction in which the main body-side surface is oriented as an operation that indicates the front direction so that the player character 200 is made to fall while moving in the front direction. On the other hand, when the orientation information represents the second orientation, the game system 1 may detect an operation of tilting the analog stick 52 in the direction in which the main body-side surface is oriented as an operation that indicates the rear direction so that the player character 200 is made to fall while moving in the rear direction.

[2-3. Third Accessory Controller Device]

[2-3-1. Configuration of Third Accessory Controller Device]

Figure 23:
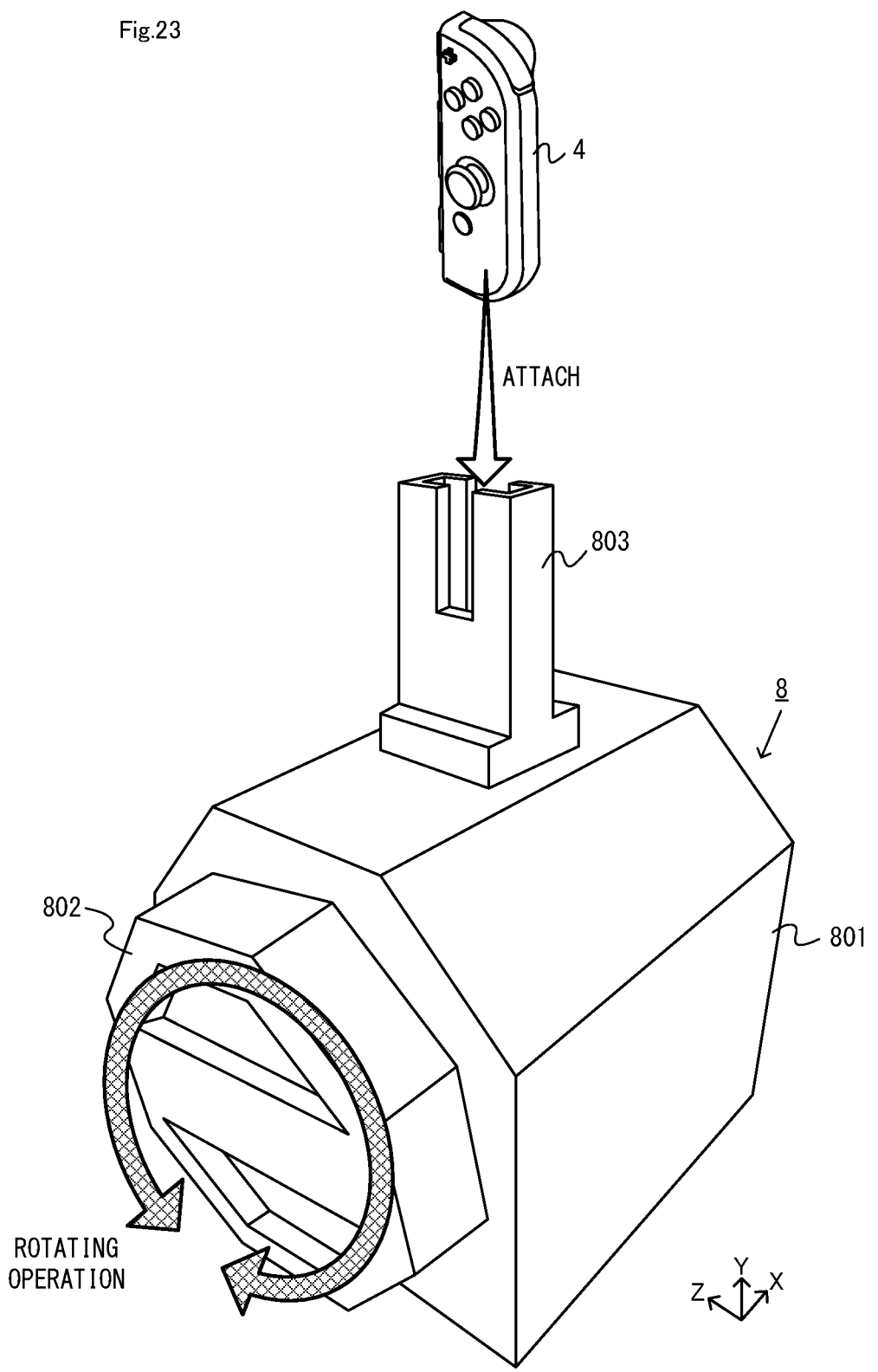
FIG. 23 is a diagram showing an example of a non-limiting third accessory controller device and a non-limiting right controller.
Figure 24:
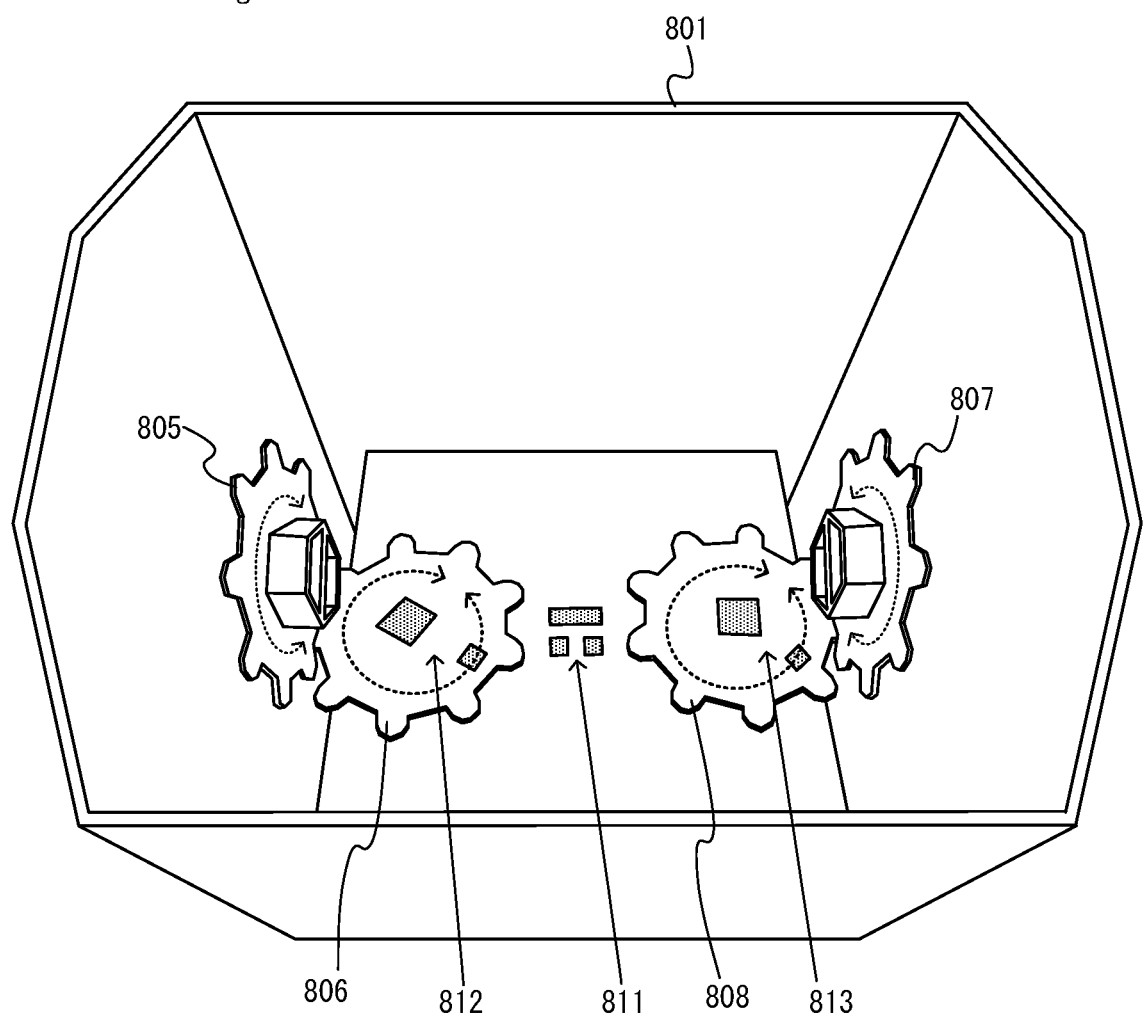
FIG. 24 is a diagram showing an example of an internal configuration of a non-limiting third accessory controller device.
Figure 25:
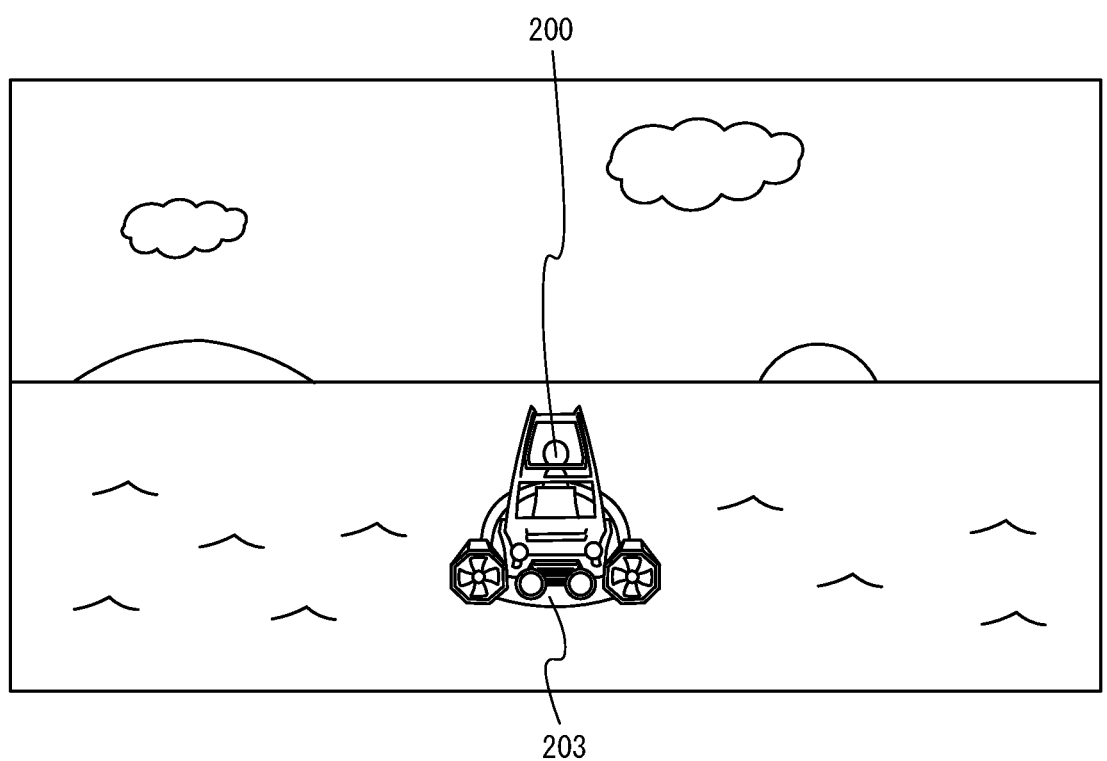
FIG. 25 is a diagram showing an example of a game image to be displayed when a non-limiting right controller is attached to a non-limiting third accessory controller device.

Referring to FIG. 23 to FIG. 25, the third accessory controller device 8 and the game process for when the right controller is attached to the third accessory controller device 8 will be described. FIG. 23 is a diagram showing an example of the third accessory controller device and the right controller.

As shown in FIG. 23, the third accessory controller device 8 includes a housing 801, a left steering wheel 802 and an attachment-receiving portion 803. Note that although not shown in the figures, the third accessory controller device 8 includes a right steering wheel on the side surface on the opposite side to the left steering wheel 802 (i.e., the X positive direction side shown in FIG. 23). The third accessory controller device 8 is a controller device of which two, left and right, steering wheels can be operated, and is a controller device for controlling the boat object 203 by using the steering wheels in the present embodiment.

With the third accessory controller device 8 shown in FIG. 23, the left steering wheel 802 is connected to the left side surface of the housing 801 (i.e., the surface on the X-axis negative direction shown in FIG. 23). The left steering wheel 802 is rotatably connected to the housing 801. Specifically, the left steering wheel 802 includes a ring-shaped portion having a ring shape, and a shaft portion extending between opposite positions along the ring-shaped portion while passing through the center of the ring-shaped portion. The left steering wheel 802 is rotatable relative to the housing 801 about the center of the ring-shaped portion or the vicinity thereof being the rotation axis. With such a configuration, the user can perform an operation of rotating the left steering wheel 802 (hereinafter referred to as the "left-side rotating operation") (FIG. 23).

Although not shown in the figures, the right steering wheel is connected to the right side surface of the housing 801 (i.e., the surface on the X-axis positive direction side shown in FIG. 23). The right steering wheel is rotatably connected to the housing 801. Specifically, the right steering wheel has a similar shape to the left steering wheel 802, and is rotatable relative to the housing 801 about the center of the ring-shaped portion of the right steering wheel or the vicinity thereof being the rotation axis. With such a configuration, the user can perform an operation of rotating the right steering wheel (hereinafter referred to as the "right-side rotating operation").

The attachment-receiving portion 803 is provided on the upper surface of the housing 801 (i.e., the surface on the Y-axis positive direction side shown in FIG. 23). The attachment-receiving portion 803 has a tubular shape, and the right controller 4 can be inserted into the inside of the attachment-receiving portion 803. As shown in FIG. 23, a groove is provided on the side surface of the tubular portion of the attachment-receiving portion 803. When the right controller 4 is inserted into the attachment-receiving portion 803, the analog stick 52 is inserted along the groove, and the insertion of the right controller 4 into the attachment-receiving portion 803 is stopped as the analog stick 52 comes into contact with the bottom of the groove.

The lower end of the attachment-receiving portion 803 (i.e., the end on the Y-axis negative direction side shown in FIG. 23) has an opening. Moreover, the housing 801 is provided with a hole at a position corresponding to the opening at the lower end of the attachment-receiving portion 803. Therefore, the infrared image capturing section 123 of the right controller 4 attached to the attachment-receiving portion 803 of the third accessory controller device 8 can capture the image of the inside of the housing 801 through the opening at the lower end of the attachment-receiving portion 803.

[2-3-2. Process Performed Based on Marker]

With the third accessory controller device 8, as with the first and second accessory controller devices 6 and 7, a marker of which an image can be captured by the infrared image capturing section 123 is provided inside the accessory controller device. The game system 1 detects a marker from the captured image obtained from the infrared image capturing section 123 of the right controller 4 attached to the third accessory controller device 8. Then, based on the marker detection results, the game system 1 detects the attachment of the right controller 4 to the third accessory controller device 8 and detects an operation performed with the third accessory controller device 8 (specifically, a left-side rotating operation and a right-side rotating operation).

FIG. 24 is a diagram showing an example of an internal configuration of the third accessory controller device. Note that FIG. 24 is a diagram showing the inside of the housing 801, with the upper surface of the housing 801 (i.e., the surface on which the attachment-receiving portion 803 is provided) removed.

As shown in FIG. 24, the third basic marker 811 is provided inside the housing 801 at such a position that the image of the third basic marker 811 can be captured by the infrared image capturing section 123 of the right controller 4 attached to the third accessory controller device 8. While there is no limitation on the shape of the third basic marker 811, the shape is different from those of the first basic marker 612 and the second basic marker 711 described above. In the example shown in FIG. 24, the third basic marker 811 has a shape composed of one rectangular and two squares.

With the third accessory controller device 8, as with the first accessory controller device 6 and the second accessory controller device 7, the game system 1 uses the basic marker to determine the type of the accessory controller device to which the right controller 4 is attached. That is, when the third basic marker 811 is detected on the captured image obtained from the right controller 4, the game system 1 determines that the right controller 4 is attached to the third accessory controller device 8.

As shown in FIG. 24, the third accessory controller device 8 includes a first left gear 805 and a second left gear 806 inside the housing 801. The first left gear 805 is connected to the left steering wheel 802, and rotates about the same rotation axis as the left steering wheel 802, following the rotation of the left steering wheel 802 (see arrows shown in FIG. 24). The second left gear 806 is rotatable relative to the housing 801. The second left gear 806 is arranged so as to mesh with the first left gear 805, and rotates about a rotation axis that is perpendicular to the rotation axis of the first left gear 805, following the rotation of the first left gear 805 (see arrows shown in FIG. 24). With such a configuration, the second left gear 806 rotates following the rotation of the left steering wheel 802.

As shown in FIG. 24, a left steering wheel marker 812 is provided on the second left gear 806 at such a position that the image of left steering wheel marker 812 can be captured by the infrared image capturing section 123 of the right controller 4 attached to the third accessory controller device 8. In the present embodiment, the left steering wheel marker 812 is composed of a first partial marker provided near the center of the second left gear 806 and a second partial marker provided near the circumference of the second left gear 806. Note that the shape of the left steering wheel marker 812 may be any shape that allows for identification of the rotation of the second left gear 806.

In the present embodiment, as the second left gear 806 rotates following the rotation of the left steering wheel 802, the orientation of the left steering wheel marker 812 (in other words, the direction from the first partial marker to the second partial marker) changes. Therefore, based on the orientation of the left steering wheel marker 812, the game system 1 can calculate the rotation angle of the left steering wheel 802 and detect an operation performed with the left steering wheel. Therefore, the game system 1 can calculate the rotation angle of the left steering wheel 802 based on the orientation of the image representing the left steering wheel marker 812 on the captured image obtained from the right controller 4 attached to the third accessory controller device 8, and detect a left-side rotating operation based on the rotation angle. Specifically, the game system 1 detects the rotation angle of the left steering wheel 802.

As shown in FIG. 24, the third accessory controller device 8 includes a first right gear 807 and a second right gear 808 inside the housing 801. The first right gear 807 is connected to the right steering wheel, and rotates about the same rotation axis as the right steering wheel, following the rotation of the right steering wheel (see arrows shown in FIG. 24). The second right gear 808 is rotatable relative to the housing 801. The second right gear 808 is arranged so as to mesh with the first right gear 807, and rotates about a rotation axis that is perpendicular to the rotation axis of the first right gear 807, following the rotation of the first right gear 807 (see arrows shown in FIG. 24). With such a configuration, the second right gear 808 rotates following the rotation of the right steering wheel.

A right steering wheel marker 813 is provided on the second right gear 808 at such a position that the image of the right steering wheel marker 813 can be captured by the infrared image capturing section 123 of the right controller 4 attached to the third accessory controller device 8. In the present embodiment, the right steering wheel marker 813 is composed of a third partial marker provided near the center of the second right gear 808 and a fourth partial marker provided near the circumference of the second right gear 808.

With such a configuration, the game system 1 can detect a right-side rotating operation, as with a left-side rotating operation. That is, the game system 1 can calculate the rotation angle of the right steering wheel based on the orientation of the image representing the right steering wheel marker 813 on the captured image obtained from the right controller 4 attached to the third accessory controller device 8, and can detect a right-side rotating operation.

[2-3-3. Game Process Performed when Marker is Detected]

FIG. 25 is a diagram showing an example of a game image to be displayed when the right controller 4 is attached to the third accessory controller device 8. When the right controller 4 is attached to the third accessory controller device 8, the game system 1 determines that the right controller 4 is attached to the third accessory controller device 8 based on the captured image obtained from the infrared image capturing section 123 of the right controller 4. Then, the game system 1 displays, on a display device, a game image that shows the player character 200 riding on the boat object 203, as shown in FIG. 25.

When it is determined that the right controller 4 is attached to the third accessory controller device 8, the game system 1 detects various operations performed with the third accessory controller device 8 (specifically, a left-side rotating operation and a right-side rotating operation), and controls the action of the boat object 203 in accordance with these operations performed by the user. Note that there is no limitation on the method for controlling the action of the boat object 203 in accordance with the operation by the user. For example, in the present embodiment, the game system 1 controls the direction of the left-side screw of the boat object 203 in accordance with the left-side rotating operation performed with the left steering wheel 802. The game system 1 controls the direction of the right-side screw of the boat object 203 in accordance with the right-side rotating operation performed with the right steering wheel. The game system 1 controls the direction of travel of the boat object 203 based on the direction of the left-side screw and the direction of the right-side screw.

As described above, by attaching the right controller 4 to the third accessory controller device 8, the user can make the boat object 203 appear in the game space play the game in which the user controls the boat object 203.

[2-4. Summary of Processes Performed Based on Marker]

As described above, in the present embodiment, the game system 1 determines the type of the accessory controller device to which the right controller 4 is attached based on the captured image that is captured by the infrared image capturing section 123. According to the present embodiment, the game system 1 makes determinations based on captured images obtained by the image-capturing device, and it is therefore possible to determine the type of the accessory controller device without the need for an electric configuration added to an accessory controller device, for example. Thus, it is possible to simplify the configuration of the accessory controller device.

Herein, in the present embodiment, the accessory controller devices 6 to 8 each include a marker as an example of a detected portion of which an image can be captured by the infrared image capturing section 123 of the right controller 4 attached to the accessory controller device. The game system 1 determines the type of the accessory controller device to which the right controller 4 is attached (i.e., one of the first to third accessory devices 6 to 8) based on the shape of a first detected portion image (an image of a basic marker in the present embodiment) representing at least a portion of a detected portion (a basic marker in the present embodiment) included in the captured image. As described above, by using the captured image that is obtained by capturing an image of a detected portion provided on each accessory controller device as a basis, the game system 1 can precisely determine the type of the accessory controller device.

While each accessory controller device includes a plurality of detected portions (i.e., markers) in the present embodiment, each accessory controller device may include only one detected portion in other embodiments. For example, each accessory controller device may only include the basic marker.

Note that in the embodiment above, the type of an accessory controller device is determined based on the shape of the image of the basic marker on the captured image. Herein, in addition to the shape of the basic marker, it is possible to distinguish basic markers from each other based also on the position of the basic marker whose image is captured (specifically, the position thereof on the captured image) or the orientation thereof (specifically, the orientation on the captured image). Therefore, in other embodiments, the game system 1 may determine the type of an accessory controller device based on at least one of the position, the shape and the orientation of the image of the basic marker. Thus, a basic marker provided on an accessory controller device may be different from basic markers provided on other types of accessory controller devices in terms of at least one of: (a) the position relative to the infrared image capturing section 123 of the right controller 4 attached to the accessory controller device, (b) the orientation relative to the infrared image capturing section 123, and (c) the shape.

In the present embodiment, each of the accessory controller devices 6 to 8 includes a movable portion that moves in accordance with an operation performed by the user. Specifically, the first accessory controller device 6 includes the steering wheel 602 and the levers 604 and 605 as movable portions, the second accessory controller device 7 includes the button 704 as a movable portion, and the third accessory controller device 8 includes the second left gear 806 and the second right gear 808 as movable portions. A movable portion may be a portion that is moved directly by the user (i.e., moved by the user touching the movable portion), as is the steering wheel 602. A movable portion may also be a portion that is moved indirectly by an operation by the user (i.e., moved as the user moves an operation portion different from the movable portion (e.g., the left steering wheel 802)), as is the second left gear 806.

In the present embodiment, as a movable portion is moved by an operation performed by the user, the relative position and/or the relative attitude between the right controller 4 attached to the accessory controller device including the movable portion and the detected portion of the accessory controller device change. The game system 1 detects an operation performed by the user based on at least one of the position and the orientation the first detected portion image and/or the second detected portion image (the second detected portion image is different from the first detected portion image) (or on the shape of the first detected portion image and/or the second detected portion image as will be described later) representing at least a portion of the detected portion included in the captured image to execute a game process based on the detected user operation. Herein, the "second detected portion image" described above refers to the first basic marker image 622, the left lever marker image 623 and the right lever marker image 624 for the first accessory controller device 6, refers to an image of the button marker 712 for the second accessory controller device 7, and refers to an image of the left steering wheel marker 812 and an image of the right steering wheel marker 813 for the third accessory controller device 8. Thus, the second detected portion image may be a basic marker image or a marker image different from the basic marker image. As described above, by using the position and/or the orientation of the marker on the captured image as a basis, it is possible to precisely detect operations by the user. For example, the game system 1 can determine the type of an accessory controller device and detect operations by the user based on a single captured image, thus improving the efficiency of the process.

Note that the game system 1 detects an operation by the user based on the position of the marker on the captured image (e.g., the position of the left lever marker image 623) or the orientation (e.g., the orientation of the first basic marker image 622) in the present embodiment. Herein, in other embodiments, the game system 1 may detect an operation by the user based on the shape of the marker in addition to (or instead of) the position and/or the orientation of the marker. For example, where the left lever 604 is rotatable about an axis parallel to the longitudinal direction thereof, a marker having a different shape may be provided on each of the four side surfaces of the left lever 604 having a quadrangular prism shape. Then, the game system 1 can determine, based on the shape of the marker on the captured image, which one of the side surfaces of the left lever 604 is facing the infrared image capturing section 123 of the right controller 4. Thus, the game system 1 can detect an operation by the user of rotating the left lever 604 about an axis parallel to the longitudinal direction thereof.

Note that the relative position and/or the relative attitude between the right controller 4 and the detected portion may change as a movable portion provided with a detected portion moves, as with the lever markers 613 and 614 of the first accessory controller device 6, the button marker 712 of the second accessory controller device 7, and the second left gear 806 and the second right gear 808 of the third accessory controller device 8. The relative position and/or the relative attitude may change as a movable portion to which the right controller 4 is attached moves, as with the steering wheel 602 of the first accessory controller device 6. The relative position and/or the relative attitude may change as a movable portion provided with a detected portion and a movable portion to which the right controller 4 is attached both move, as with the first accessory controller device 6. Then, it is possible to detect a change in the relative position and/or the relative attitude by detecting the detected portion, and it is possible to precisely detect operations performed by the user.

In the present embodiment, the game system 1 further determines that the right controller 4 is attached to none of the accessory controller devices 6 to 8, in addition to determining the type of the accessory controller device to which the right controller 4 is attached. Specifically, while the game application is being executed, the game system 1 repeatedly obtains, from the right controller 4, the captured image that is captured by the infrared image capturing section 123. Then, when none of the basic markers is detected from the captured image, the game system 1 determines that the right controller 4 is attached to none of the accessory controller devices. Thus, the game system 1 can determine whether or not the right controller 4 is attached to accessory controller device, in addition to determining the type of the accessory controller device to which the right controller 4 is attached, and it is possible to more specifically determine the attachment state of the right controller 4.

[2-5. Summary of Game Processes Performed in Accordance with Attachment State]

As described above, in the present embodiment, the game process is executed in accordance with switching between different types of accessory controller devices to which the right controller 4 is attached. Specifically, the game system 1 executes the game process described below with different process content depending on the type of the accessory controller device.

In the present embodiment, the game system 1 generates a different game image depending on the type of the accessory controller device to which the right controller 4 is determined to be attached (FIG. 16, FIG. 20, FIG. 25). Specifically, depending on the determined type of the accessory controller device, the game system 1 changes a game image showing a vehicle object that is controlled based on game operations performed by using the right controller 4 and the accessory controller device to which the right controller 4 is attached. Then, the user can change an object to be controlled by using an accessory controller device by attaching the right controller 4 to a different accessory controller device. Therefore, according to the present embodiment, the game system 1 can give the user a novel feel of operation when an object to be controlled is switched to another by switching the accessory controller device to which a controller is attached.

Note that in other embodiments, there is no limitation on the content of the game image that changes depending on the type of the accessory controller device. While the object to be controlled by the user changes depending on the type of the accessory controller device in the present embodiment, an object that is not an object to be controlled by the user (e.g., a garment or garments of the player character and/or an item or items owned, etc.) may change depending on the type of the accessory controller device in other embodiments. The game system 1 may change the entire object (e.g., change the player character) or may change a part of the object (e.g., a garment or garments of the player character and/or an item or items owned, etc.) depending on the type of the accessory controller device. Note that the change of the object may be a change only in the shape of the object, a change only in the color thereof, or a change in the shape and color. For example, the game image may represent a two-dimensional game world, and the game system 1 may change the image representing a two-dimensional object depending on the type of the accessory controller device.

In other embodiments, the game system 1 may also change a game sound (e.g., BGM output during the game) in addition to (or instead of) the game image, depending on the type of the accessory controller device to which the right controller 4 is determined to be attached.

In the present embodiment, when it is determined that the right controller 4 is attached to none of the accessory controller devices, the game system 1 executes a game process different from those when the right controller 4 is attached to any accessory controller device. More specifically, the game system 1 generates different game images for the two cases described above (FIG. 20, FIG. 21). Then, the user can change the game image to be displayed based also on whether or not the right controller 4 is attached to any accessory controller device, in addition to changing the type of the accessory controller device to which the right controller 4 is attached.

In the present embodiment, based on the type of the accessory controller device to which the right controller 4 is determined to be attached, the game system 1 controls the position and/or the attitude of a virtual camera arranged in a virtual space. In the present embodiment, the position and the attitude of the virtual camera change depending on the type of the accessory controller device to which the right controller 4 is attached. Specifically, in the present embodiment, the virtual camera is arranged behind the object controlled by the user in such an attitude that the virtual camera faces the controlled object (FIG. 16, FIG. 20, FIG. 25). Herein, when the right controller 4 is attached to the first accessory controller device 6, the position and the attitude of the virtual camera are set so that the automobile object 201, which is the controlled object, is displayed slightly below the center of the screen (FIG. 16). When the right controller 4 is attached to the third accessory controller device 8 and when the right controller 4 is attached to none of the accessory controller devices, the virtual camera is set similarly to when the right controller 4 is attached to the first accessory controller device 6. In contrast, when the right controller 4 is attached to the second accessory controller device 7, the position and the attitude of the virtual camera are set so that the airplane object 202, which is the controlled object, is displayed at the center of the screen (FIG. 20). Thus, by setting the virtual camera depending on the type of the accessory controller device to which the right controller 4 is attached, the game system 1 can present, to the user, a game image as seen from a point of view that is suitable for circumstances in the game.

In the present embodiment, the game system 1 changes the input or inputs to be used in the game process depending on the type of the accessory controller device to which the right controller 4 is determined to be attached. That is, in the present embodiment, the right controller 4 includes a plurality of types of operation detection portions for detecting operations performed by the user using the right controller 4. Specifically, as the operation detection portions, the right controller 4 includes the buttons 113, the analog stick 52, the acceleration sensor 114 and the angular velocity sensor 115. Herein, when it is determined that the right controller 4 is attached to a certain type of an accessory controller device (the second accessory controller device 7 in the present embodiment), the game system 1 executes the game process based on a detection result from one of the plurality of types of operation detection portions that corresponds to the determined type of the sub device (the acceleration sensor 114 in the present embodiment). Therefore, according to the present embodiment, the game system 1 can execute the game process based on a detection result from an operation detection portion that is suitable for the type of the accessory controller device to which the right controller 4 is attached. For example, when the right controller 4 is attached to the second accessory controller device 7, the game system 1 can detect a tilting operation performed with the handle portion 702 by using a detection result from the acceleration sensor 114 as a basis, and execute the game process by using an detection result from the acceleration sensor 114 (in other words, the content of the tilting operation calculated based on the detection result) as a user input.

Note that in other embodiments, the game system 1 may change the content of the game process that is executed based on the detection result from the operation detection portion depending on the type of the accessory controller device to which the right controller 4 is determined to be attached. For example, the game system 1 may change, depending on the type of the accessory controller device, the game operation to be detected based on the detection result from the operation detection portion, and may change, depending on the type of the accessory controller device, the game process to be executed in accordance with the game operation to be detected based on the detection result from the operation detection portion.

Specifically, in other embodiments, when the right controller 4 is in the first attachment state, the game system 1 may detect a rotating operation performed with the steering wheel 602 based on the detection result from the acceleration sensor 114. Then, the game system 1 calculates the attitude of the right controller 4 with respect to the rotation about an axis parallel to the longitudinal direction of the right controller 4 based on the detection result from the acceleration sensor 114, and executes the game process based on the attitude. In contrast, in the second attached state, the game system 1 calculates the attitude of the right controller 4 with respect to the rotation about two axes perpendicular to the longitudinal direction of the right controller 4 based on the detection result from the acceleration sensor 114, and executes the game process based on the attitude. Thus, when executing the game process in accordance with the attitude based on the detection result from the acceleration sensor 114, the game system 1 may calculate attitudes about different axes depending on the type of the accessory controller device to which the right controller 4 is attached. As a result, the content of the game process executed based on the detection result varies depending on the type of the accessory controller device to which the right controller 4 is attached.

In other embodiments, the operation detection portion used in the game process is not limited to the acceleration sensor 114, but may be the buttons 113, the analog stick 52 and the angular velocity sensor 115, etc. For example, the game system 1 may execute the game process of moving the virtual camera in accordance with the detection result from the analog stick 52 (in other words, the input made with the analog stick 52) in the first attachment state, and may execute the game process of changing the attitude of the airplane object 202 in accordance with the detection result from the analog stick 52 in the second attached state. Thus, an operation that is detected based on the detection result from the operation detection portion may be an operation performed with an operation portion of the right controller 4 or may be an operation of moving the right controller 4.

[2-6. Process During Attachment]

As described above, in the present embodiment, the game system 1 detects the attachment state of the right controller 4 and detects game operations by using the infrared image capturing section 123 of the right controller 4 to capture the image of markers of an accessory controller device. Herein, halfway through the attachment of the right controller 4 to an accessory controller device, the game system 1 may recognize (in other words, detect) only some of the markers of the accessory controller device. In such a case, in the present embodiment, the game system 1 notifies the user that the attachment of the right controller 4 is halfway through, while detecting some game operations. Referring to FIG. 26, the process to be performed when the attachment of the right controller 4 is halfway through will now be described.

FIG. 26 is a diagram showing an example of a case of a partially-recognized state and a case of a fully-recognized state. Note that FIG. 26 shows an example where the right controller 4 is attached to the first accessory controller device 6. As shown in FIG. 26, in a state where the right controller 4 is inserted halfway through the first accessory controller device 6 (the upper left section in FIG. 26), the infrared image capturing section 123 can capture the image of only the first basic marker 612 and cannot capture the image of other markers (i.e., the lever markers 613 and 614).

Herein, in the present embodiment, with each of the accessory controller devices 6 to 8, the distance from the axis of insertion, along which the right controller 4 is inserted into the accessory controller device, to the basic marker is set to be smaller than the distance from the axis of insertion to the other markers. That is, the basic marker is arranged near the axis of insertion while the other markers are arranged farther away from the axis of insertion. Note that the "axis of insertion" refers to a straight line that is parallel to the direction is the right controller 4 is inserted into the accessory controller device and that passes through the right controller 4. Therefore, in the present embodiment, when the attachment of the right controller 4 is halfway through, the image of only the basic marker may be captured by the infrared image capturing section 123 because of the inner wall of the tubular portion of the accessory controller device (i.e., the portion into which the right controller 4 is inserted) blocking the field of view of the infrared image capturing section 123.

When the image of only the first basic marker 612 is captured by the infrared image capturing section 123 as described above, the captured image includes the first basic marker image 622 but does not include the other marker images (i.e., the lever marker images 623 and 624) (the upper center section in FIG. 26). In such a case, the basic marker is recognized based on the captured image while the other markers are not recognized. Note that the state where the basic marker is recognized based on the captured image from the infrared image capturing section 123 while the other markers are not recognized will be hereinafter referred to as the "partially-recognized state" (the upper row in FIG. 26). The state where the basic marker and the other markers are both recognized based on the captured image from the infrared image capturing section 123 will be referred to as the "fully-recognized state" (the lower row in FIG. 26).

In the partially-recognized state, since the first basic marker 612 is detected, the game system 1 executes the game process based on the first basic marker 612. Specifically, in the partially-recognized state, the game system 1 determines that the right controller 4 is attached to the first accessory controller device 6 and makes the automobile object 201 appear in the game space. Then, the game system 1 detects the rotating operation described above and controls the action of the automobile object 201 in accordance with the rotating operation. Note that in the partially-recognized state, since the lever markers 613 and 614 are not detected, the game system 1 fails to detect the lowering operation described above and therefore does not control the action of the automobile object 201 in accordance with the lowering operation.

As described above, in the partially-recognized state, the user cannot perform some game operations (i.e., the lowering operation in the case of the first accessory controller device 6). Therefore, the game system 1 notifies the user that the user can only perform some game operations. That is, in the partially-recognized state, the game system 1 displays, on a display device, a game image that is different from the game image displayed in the fully-recognized state. In the present embodiment, the game system 1 displays an image showing smoke coming out of the automobile object 201 (the upper right section in FIG. 26). Therefore, the user knows that the right controller 4 is not attached correctly, and thus the game system 1 can prompt the user to attach the right controller 4 correctly.

On the other hand, in the state where the right controller 4 is inserted all the way into the first accessory controller device 6 (i.e., inserted correctly) (the lower left section in FIG. 26), the infrared image capturing section 123 can capture the image of both the first basic marker 612 and the lever markers 613 and 614. Therefore, in this state, the captured image includes the first basic marker image 622 and other marker images (i.e., the lever marker images 623 and 624) (the lower center section in FIG. 26), and the game system 1 can recognize the first basic marker 612 and the lever markers 613 and 614. Therefore, the game system 1 executes both the game process based on the first basic marker 612 and the game process based on the lever markers 613 and 614. That is, the game system 1 displays a game image that includes the normal automobile object 201 (i.e., the automobile object 201 with no smoke coming out) (the lower right section in FIG. 26). Moreover, the game system 1 detects the rotating operation and the lowering operation described above, and controls the action of the automobile object 201 in accordance with the rotating operation and the lowering operation.

FIG. 26 shows an example where the right controller 4 is attached to the first accessory controller device 6. Similarly, also where the right controller 4 is attached to a different accessory controller device, the game system 1 in the partially-recognized state executes only some of the game processes that are executed in the fully-recognized state.

Specifically, in the partially-recognized state where the right controller 4 is attached to the second accessory controller device 7, the game system 1 determines that the right controller 4 is attached to the second accessory controller device 7 and makes the airplane object 202 appear in the game space. Then, the game system 1 detects the tilting operation described above, and controls the action of the airplane object 202 in accordance with the tilting operation. When the right controller 4 is attached to the second accessory controller device 7, the tilting operation is detected not based on a marker, and the game system 1 can therefore detect the tilting operation even in the partially-recognized state. The game system 1 displays, on a display device, an image showing smoke coming out of the airplane object 202.

In the partially-recognized state where the right controller 4 is attached to the third accessory controller device 8, the game system 1 determines that the right controller 4 is attached to the third accessory controller device 8, and makes the boat object 203 appear in the game space. Note that in this state, since there is no user operations that can be detected, the game system 1 does not control the action of the boat object 203 in accordance with user operations. Thus, the game system 1 does not need to detect game operations in the partially-recognized state for all types of accessory controller devices. The game system 1 displays, on a display device, an image showing smoke coming out of the boat object 203.

As described above, in the present embodiment, the detected portions (i.e., markers) of an accessory controller device include the first portion (i.e., the basic marker) and the second portion (i.e., a marker other than the basic marker). The game system 1 recognizes the first portion included in the captured image and recognizes the second portion included in the captured image. The game system 1 determines the type of an accessory controller device to which the right controller 4 is attached based on at least one of the position, the shape and the orientation of the first portion image representing the first portion. As for the attachment state of the right controller attached to the accessory controller device, the game system 1 determines the partially-recognized state where the first portion is recognized and the second portion is not recognized and the fully-recognized state where the first portion and the second portion are recognized. In other words, the game system 1 determines the degree to which the right controller 4 is attached to the accessory controller device based on the recognition result of the first portion (i.e., whether or not the first portion is recognized) and the recognition result of the second portion. Note that in other words, the "degree to which the right controller 4 is attached to the accessory controller device" refers to the degree representing how much the right controller 4 is attached to the accessory controller device. In the present embodiment, it indicates whether the right controller 4 is attached halfway into the accessory controller device or the right controller 4 is attached all the way into the accessory controller device. Thus, the game system 1 can determine whether the right controller 4 is correctly attached to the accessory controller device or the right controller 4 is attached halfway through.

The game system 1 executes a first game process (i.e., a process of displaying an image showing smoke coming out of the vehicle object) when it is determined that the attachment state of the right controller 4 is the partially-recognized state, and executes a second game process different from the first game process (i.e., a process of displaying an image showing no smoke coming out of the vehicle object) when it is determined that the attachment state of the right controller 4 is the fully-recognized state. In other words, the game system 1 executes different game processes depending on the degree to which the right controller 4 is attached to the accessory controller device. Thus, the user can easily know whether or not the right controller 4 is attached to the accessory controller device correctly.

Note that in the present embodiment, based on at least one of the position and the orientation of the first portion image, the game system 1 detects a first-type operation performed by the user (e.g., a rotating operation performed with the first accessory controller device 6), and executes a game process based on the detected first-type operation. Based on at least one of the position and the orientation of the second portion image, the game system 1 detects a second-type operation performed by the user (e.g., a lowering operation performed with the first accessory controller device 6), and executes a game process based on the detected second-type operation. Thus, the user can perform some of the game operations even when the right controller 4 is attached halfway into the accessory controller device. Therefore, in the present embodiment, the game system 1 can improve the operability when performing game operations using an accessory controller device.

Note that as described above, in the present embodiment, each accessory controller device is made of corrugated cardboard and is assembled by the user. Therefore, it is possible that the user fails to properly assemble an accessory controller device so that the user cannot smoothly attach (in other words, insert) the right controller 4 into the accessory controller device. In contrast, according to the present embodiment, even if the user cannot smoothly attach the right controller 4 into the accessory controller device, resulting in the partially-recognized state, the game system 1 can give a notification to the user so as to prompt the user to attach the right controller 4 correctly.

In the present embodiment, even when certain operation portions of an accessory controller device (e.g., the levers 604 and 605 of the first accessory controller device 6) are lost by being broken, for example, the game system 1 can detect operations performed with operation portions other than the certain operation portions.

[3. Specific Examples of Processes Performed on Game System]

Next, referring to FIG. 27 to FIG. 29, specific examples of information processes to be performed on the game system 1 will be described.

[3-1. Data Used in Information Processes]

FIG. 27 is a diagram showing an example of various data used in information processes performed on the game system 1. The various data shown in FIG. 27 are stored in storage media that can be accessed by the main body apparatus 2 (e.g., a storage medium attached to the slot 23, the flash memory 84 and/or the DRAM 85).

As shown in FIG. 27, the main body apparatus 2 stores a game program 301. The game program 301 is a program of a game application for executing a game of the present embodiment, and is stored in a storage medium attached to the slot 23 or the flash memory 84, for example.

As shown in FIG. 27, the main body apparatus 2 stores operation data 302, attachment state data 303, recognition state data 304, orientation data 305, front direction data 306, and object data 307. These data (in other words, information) 302 to 307 are obtained or generated in the information processes (FIG. 28 and FIG. 29) to be described later.

The operation data 302 is operation data received from the controller. In the present embodiment, the operation data 302 includes data of the captured image from the infrared image capturing section 123. Note that in other embodiments, the operation data 302 may include information obtained through a certain process on the captured image and/or information obtained from the captured image (e.g., information representing the position and the orientation of markers). Note that when the main body apparatus 2 receives operation data from a plurality of controllers, the main body apparatus 2 stores the operation data 302 for each controller.

The attachment state data 303 represents the attachment state of the right controller 4. Specifically, the attachment state data 303 represents one of the first to third attachment states and the non-attached state.

The recognition state data 304 represents the marker recognition state of the game system 1. Specifically, the recognition state data 304 represents the partially-recognized state or the fully-recognized state described above.

The orientation data 305 represents the orientation information described above, specifically, the first orientation or the second orientation.

The front direction data 306 represents the front direction of the right controller 4 that is set in the non-attached state. In the present embodiment, the front direction data 306 represents the direction in which the main body-side surface is oriented or the opposite direction thereto.

The object data 307 represents information regarding objects controlled by the user (i.e., a player character and a vehicle object). Specifically, the object data 307 includes data representing whether or not the player character is operating a vehicle object, and if so, includes data representing the type of the vehicle object being operated by the player character. The object data 307 also includes data of various parameters representing the state (e.g., the position and the orientation, etc., in the game space) of the player character or the vehicle object.

Figure 28:
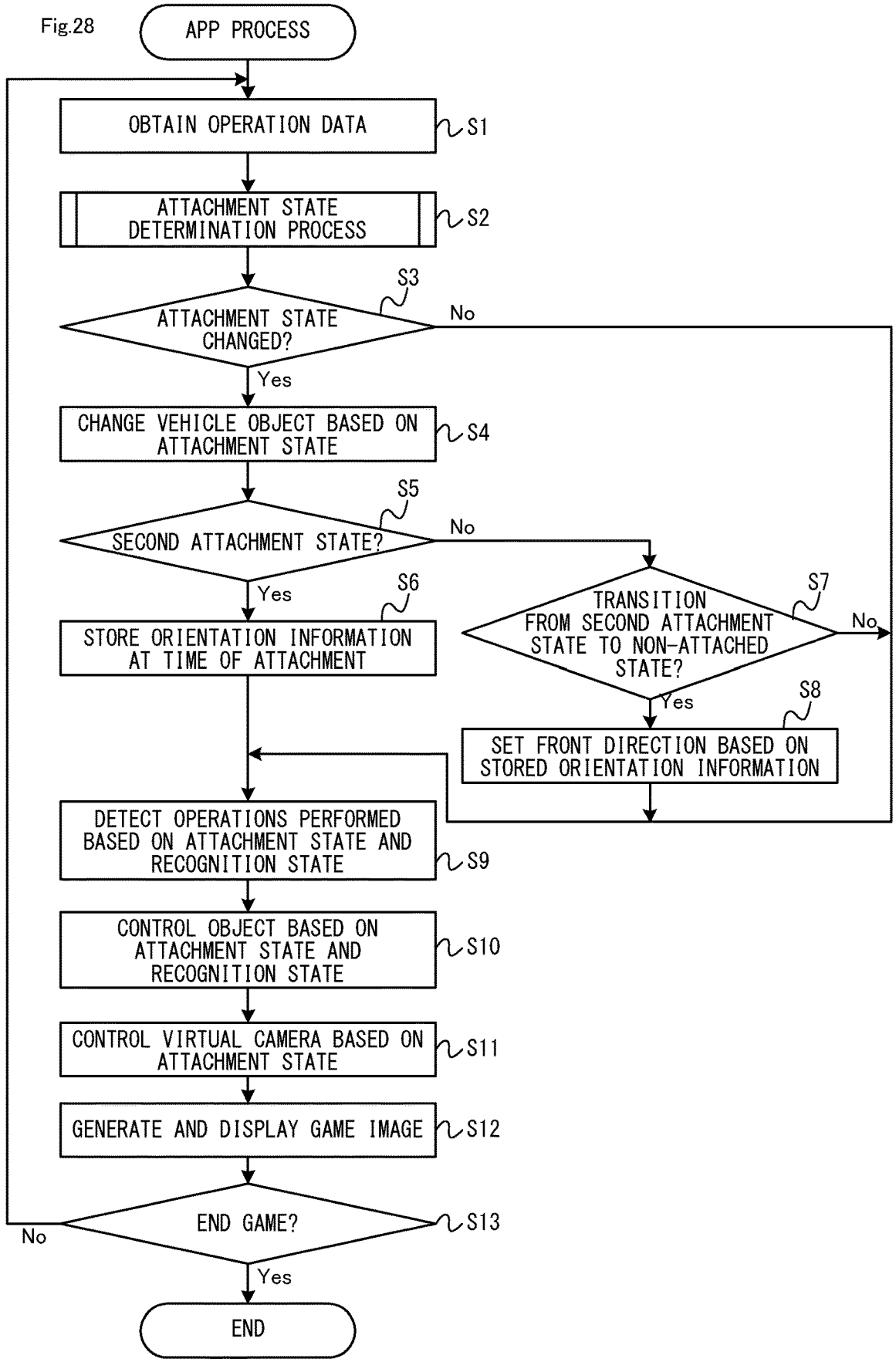
FIG. 28 is a flow chart showing an example of a flow of information processes executed on a non-limiting information processing apparatus.

FIG. 28 is a flow chart showing an example of a flow of information processes executed on the information processing apparatus. Note that the series of processes shown in FIG. 28 are started in response to satisfaction of a predetermined condition (e.g., the user gives an instruction to play the game) after the start of the game program 301.

Note that the present embodiment will be described assuming that the processor 81 (in other words, a computer) of the main body apparatus 2 executes the processes of the steps shown in FIG. 28 and FIG. 29 by executing the game program 301. Note however that in other embodiments, some of the processes of the steps may be executed by a processor other than the processor 81 (e.g., a dedicated circuit, etc.). When the main body apparatus 2 can communicate with a server, some of the processes of the steps shown in FIG. 28 and FIG. 29 may be executed on the server. When the controller includes an information processing section (e.g., a processor), some of the processes of the steps shown in FIG. 28 and FIG. 29 may be executed on the controller. The processes of the steps shown in FIG. 28 and FIG. 29 are merely an example, and the order of steps may be changed or other processes may be executed in addition to (or instead of) the processes of the steps, as long as similar results are obtained.

The processor 81 of the main body apparatus 2 executes the processes of the steps shown in FIG. 28 and FIG. 29 by using a memory (specifically, the flash memory 84 and/or the DRAM 85). That is, the processor 81 stores data obtained from the process steps in a memory, and reads out the data from the memory when using the data in subsequent process steps.

In step S1 shown in FIG. 28, the processor 81 obtains operation data. Since the right controller 4 repeatedly transmits operation data to the main body apparatus 2, the main body apparatus 2 successively receives the operation data and stores the operation data in the memory as the operation data 302. The operation data 302 may include a predetermined number of operation data arranged in an order starting from the latest data. In step S1, the processor 81 reads out the operation data 302 from the memory. The process of step S2 is executed, following step S1.

In step S2, the processor 81 executes the attachment state determination process. The attachment state determination process is a process of determining the state regarding the attachment of the right controller 4 to the accessory controller device. Referring to FIG. 29, the details of the attachment state determination process will now be described.

FIG. 29 is a sub flow chart showing an example of a detailed flow of the attachment state determining process of step S2 shown in FIG. 28. In the attachment state determination process, first, in step S21, the processor 81 detects marker images. Specifically, from data of a captured image included in the operation data 302 stored in the memory, the processor 81 detects marker images included in the captured image.

There is no limitation on the method for detecting marker images from a captured image. In the present embodiment, a marker image on a captured image appears to be a high-brightness region. Therefore, the processor 81 extracts a high-brightness region from a captured image, and detects the extracted region as a marker image region. In a state where the right controller 4 is attached halfway into an accessory controller device, the captured image may include a noise image as well as a marker image. A noise image occurs when infrared light from the infrared light-emitting section 124 is diffused at the inner wall of the tubular portion of the accessory controller device and received by the infrared image capturing section 123. Since such a noise image is larger than a marker image, the processor 81 determines that any region whose size is greater than or equal to a predetermined size, of the high-brightness regions extracted from the captured image, is a noise image, and does not detect such a region as a marker image. Note that the processor 81 may determine a marker image and a noise image based on the brightness and/or the shape of the high-brightness region.

As described above, in step S21 described above, a marker image is detected in the state where the right controller 4 is attached to an accessory controller device. Note that where the captured image includes a plurality of marker images, the processor 81 detects each of the marker images (i.e., a basic marker image and other marker images). In the state where the right controller 4 is attached halfway into an accessory controller device, only the basic marker image may be detected. On the other hand, in the state where the right controller 4 is not attached to an accessory controller device, no marker image is detected. The process of step S22 is executed, following step S21.

In step S22, the processor 81 determines whether or not a basic marker is recognized based on the detection result from step S21. In the present embodiment, the processor 81 makes a determination based on the current detection result and a past detection result. Specifically, the processor 81 calculates the determination value L(t) according to Expression (1) below.

$$L(t)=p \cdot Lc(1-p) \cdot L(t-1) \qquad (1)$$

In Expression (1), the variable Lc is a numerical value representing the current detection result. Specifically, the variable Lc is 1 when a basic marker is detected and 0 when a basic marker is not detected. The variable L(t−1) is a determination value calculated in the process of step S22 in the previous iteration. The constant p is predetermined in the range of 0<p≤1. The greater the constant p, the higher the degree by which the past detection result (i.e., L(t−1)) is reflected in the determination value L(t).

When the calculated determination value L(t) is greater than a predetermined threshold value, the processor 81 determines that a basic marker is recognized. On the other hand, when the calculated determination value L(t) is less than or equal to the predetermined threshold value, the processor 81 determines that a basic marker is not recognized. When the determination result is negative in step S22, the process of step S23 is executed. On the other hand, when the determination result is affirmative in step S22, the process of step S24 is executed.

Note that there is no limitation on the method for determining whether or not a marker is recognized based on the marker image detection result. For example, in other embodiments, the processor 81 may make the determination based only on the detection result from step S21 in the latest iteration (in other words, setting the coefficient p to 1). For example, in other embodiments, it may be determined that a basic marker image is recognized when the basic marker image is detected in step S21 consecutively for a predetermined number of times.

In step S23, the processor 81 determines that the state of the right controller 4 is the non-attached state. That is, the processor 81 stores the attachment state data 303 representing the non-attached state in the memory. After step S23, the processor 81 ends the attachment state determination process.

On the other hand, in step S24, the processor 81 determines the type of the accessory controller device to which the right controller 4 is attached based on the recognized basic marker. That is, as described in "[2-1-2. Process performed based on marker]" above, the first to third basic markers of the accessory controller devices 6 to 8 have shapes different from each other, and the processor 81 determines the type of the accessory controller device by identifying the shape of the recognized basic marker. The processor 81 stores the attachment state data 303 representing the determination result (i.e., one of the first to third accessory controller devices) in the memory. The process of step S25 is executed, following step S24.

In step S25, the processor 81 determines whether or not any marker image other than the basic marker image has been detected in step S21. For example, when only the basic marker image is detected in step S21 (including cases where the noise image is detected), the processor 81 determines that other marker images have not been detected. When the determination result is affirmative in step S25, the process of step S26 is executed. On the other hand, when the determination result is negative in step S25, the process of step S28 to be described later is executed.

In step S26, the processor 81 determines whether or not the right controller 4 is stationary. Herein, in the state where the right controller 4 is attached halfway into an accessory controller device, the right controller 4 is moving. In this state, since the position of the marker image on the captured image moves following the movement of the right controller 4, it may not be possible to correctly detect an operation based on the marker. In view of this, according to the present embodiment, when the right controller 4 is stationary, it is determined that the right controller 4 is in the fully-recognized state. The determination in step S26 is made so as to detect operations based on the marker in such a case. That is, in the present embodiment, the determination results from steps S25 and S26 are both affirmative, the game system 1 recognizes other marker images.

In the present embodiment, the determination of step S26 is done based on the recognized basic marker. That is, the processor 81 determines that the right controller 4 is stationary when the state where the basic marker image detected on the captured image has not changed (e.g., the amount of movement from the previously-detected basic marker image is less than or equal to a predetermined value and the amount of change in size from the previously-detected basic marker image is less than or equal to a predetermined value) has continued over a predetermined period of time. On the other hand, when the state where the basic marker image detected on the captured image has not changed has not continued over a predetermined period of time, the processor 81 determines that the right controller 4 is not stationary. Note that in other embodiments, the determination of step S26 may be made based on the detection result of the acceleration sensor 114 and/or the angular velocity sensor 115 of the right controller 4 in addition (or instead of) the basic marker. When the determination result is affirmative in step S26, the process of step S27 is executed. On the other hand, when the determination result is negative in step S26, the process of step S28 to be described later is executed.

In step S27, the processor 81 determines that the current state is the fully-recognized state. That is, the processor 81 stores the recognition state data 304 representing the fully-recognized state in the memory. The process of step S29 to be described later is executed, following step S27.

On the other hand, in step S28, the processor 81 determines that the current state is the partially-recognized state. That is, the processor 81 stores the recognition state data 304 representing the partially-recognized state in the memory. The process of step S29 is executed, following step S28.

In step S29, the processor 81 calculates the position and the orientation, on the captured image, of each marker image that is used for detecting operations. Note that a "marker image that is used for detecting operations" refers to the first basic marker image 622 and the marker images 623 and 624 for the first attachment state, the marker image of the button marker 712 for the second attached state, and the images of the steering wheel markers 812 and 813 for the third attachment state. The processor 81 stores data representing the calculated position and the orientation for each marker image in the memory. Note that when it is determined that the right controller 4 is in the partially-recognized state (step S28), and when there is no marker image that is used for detecting operations, the processor 81 does not calculate the position and the orientation of a marker image. After step S29, the processor 81 ends the attachment state determination process. After ending the attachment state determination process, the process of step S3 shown in FIG. 28 is executed.

In step S3, the processor 81 determines whether or not the attachment state of the right controller 4 has changed. Specifically, the processor 81 makes the determination of step S3 based on whether or not the content of the attachment state data has been updated in step S2. When the determination result is affirmative in step S3, the process of step S4 is executed. On the other hand, if the determination result is negative in step S3, the process of step S9 to be described later is executed.

In step S4, the processor 81 changes the vehicle object to be operated by the player character 200 based on the attachment state of the right controller 4. That is, of the object data 307 stored in the memory, the processor 81 updates data representing the vehicle object operated by the player character 200. Specifically, when the right controller 4 is in the first attachment state, data representing the automobile object 201 is stored in the memory; when the right controller 4 is in the second attached state, data representing the airplane object 202 is stored in the memory; and when the right controller 4 is in the third attachment state, data representing the boat object 203 is stored in the memory. The process of step S5 is executed, following step S4.

In step S5, the processor 81 determines whether or not the right controller 4 is in the second attached state. When the determination result is affirmative in step S5, the process of step S6 is executed. On the other hand, when the determination result is negative in step S5, the process of step S7 is executed.

In step S6, the processor 81 stores orientation information representing the orientation when the right controller 4 is attached to the second accessory controller device 7. Specifically, the processor 81 stores orientation data representing the first orientation or the second orientation in the memory. Note that the processor 81 can determine the orientation of the right controller 4 when the right controller 4 is attached to the second accessory controller device 7 based on the orientation of the basic marker image detected upon attachment. The process of step S9 to be described later is executed, following step S6.

In step S7, the processor 81 determines whether or not the right controller 4 has transitioned from the second attached state to the non-attached state. This determination is made based on whether or not the attachment state data stored in the memory has been updated from data indicating the second attached state to data indicating the non-attached state. On the other hand, when the determination result is affirmative in step S7, the process of step S8 is executed. On the other hand, when the determination result is negative in step S7, the process of step S9 is executed.

In step S8, the processor 81 sets the front direction of the right controller 4 based on the orientation data stored in the memory. Specifically, the processor 81 sets the front direction of the right controller 4 by the method described in "[2-2-4. Process performed upon transition from second attached state to non-attached state]" above. The processor 81 stores data indicating the front direction that has been set in the memory as the front direction data 306. The process of step S9 is executed, following step S8.

In step S9, the processor 81 detects operations performed by the user based on the attachment state and the recognition state of the right controller 4. In the present embodiment, operations to be detected based on the attachment state and the recognition state of the right controller 4 are as follows.

Fully-recognized state in first attachment state: rotating operation and lowering operation Partially-recognized state in first attachment state: rotating operation Fully-recognized state in second attached state: tilting operation and depressing operation Partially-recognized state in second attached state: tilting operation Fully-recognized state in third attachment state: left-side rotating operation and right-side rotating operation Partially-recognized state in third attachment state: None Non-attached state: operations performed with the right controller 4

The processor 81 detects the various operations based on the operation data. In accordance with the attachment state, the processor 81 identifies the operation detection portions described above as necessary. In the present embodiment, when the attachment state of the right controller 4 is the second attached state, the acceleration sensor 114 is identified. Then, the processor 81 detects operations based on the captured image, and when an operation detection portion is identified, detects operations based on the detection result from the operation detection portion. Note that the specific methods for detecting the various operations are as described above in "[2-1-2. Process performed based on marker]", "[2-2-2. Process performed based on marker]" and "[2-3-2. Process performed based on marker]". Note that in the non-attached state, operations to be detected may vary depending on the state of the player character 200 (i.e., whether it is standing on the ground or airborne wearing a parachute). For example, the processor 81 detects operations performed with the analog stick 52 of the right controller 4 when the player character 200 is standing on the ground, and the processor 81 detects operations of changing the attitude of the right controller 4 when the player character 200 is airborne wearing a parachute. The process of step S10 is executed, following step S9.

In step S10, based on the detected operation, the processor 81 controls a controlled object (i.e., the player character 200 or a vehicle object) depending on the attachment state of the right controller 4. That is, in the first attachment state, the processor 81 controls the automobile object 201 in accordance with rotating operations and lowering operations as described above. In the second attached state, the processor 81 controls the airplane object 202 in accordance with tilting operations and depressing operations as described above. In the third attachment state, the processor 81 controls the boat object 203 in accordance with left-side rotating operations and right-side rotating operations as described above. In the non-attached state, the processor 81 controls the player character 200 in accordance with operations performed with the right controller 4. The process of step S11 is executed, following step S10.

In step S11, the processor 81 sets a virtual camera in accordance with the attachment state of the right controller 4. That is, the processor 81 sets a virtual camera to be in a position and an attitude based on the attachment state by the method described above in "[2-5. Summary of game processes performed in accordance with attachment state]". The process of step S12 is executed, following step S11.

Note that in the series of operations through steps S9 to S11, the attachment state and the recognition state of the right controller 4 can be known by referring to the attachment state data 303 and the recognition state data 304 stored in the memory.

In step S12, the processor 81 generates a game image based on the virtual camera, and displays the generated game image on a display device. That is, the processor 81 displays, on a display device, a game image showing the game space as seen from the virtual camera that has been set in step S11, wherein the object whose action is controlled by the process in step S10 is included in the game space. Note that when the recognition state of the right controller 4 is the partially-recognized state, the processor 81 displays a game image showing smoke coming out of the vehicle object. The process of step S13 is executed, following step S12.

In step S13, the processor 81 determines whether or not to end the game. For example, the processor 81 determines to end the game when a certain game-ending condition (e.g., the player character having reached the goal), or when the user has given an input representing a game-ending instruction. When the determination result is negative in step S13, the process of step S1 is executed again. The processor 81 repeatedly executes the process loop through steps S1 to S13 until it is determined in step S13 to end the game. On the other hand, when the determination result is affirmative in step S13, the processor 81 ends the information process shown in FIG. 28.

[4. Functions/Effects and Variations of Present Embodiment]

According to the embodiment described above, a game program, which is an example of an information processing apparatus, causes a computer (i.e., the processor 81) of the game system 1 including a plurality of types of sub devices (i.e., accessory controller devices) and a main device (i.e., the right controller 4) that can be attached to and detached from any of the plurality of types of sub devices to function as the following units.

- a determination unit (step S24) for determining the type of a sub device to which the main device is attached, from among the plurality of types of sub devices, while a game application is being executed.
- a game process execution unit (steps S9 to S12) for executing a game process based on a game operation performed by using the main device and/or the sub device to which the main device is attached, while a game application is being executed.

The game process execution unit executes a game process depending on the determined type of the sub device.

While the "computer" is a single computer (specifically, the processor 81) in the embodiment above, it may be a plurality of computers in other embodiments. The "computer" may be (a plurality of) computers, and more specifically, the "computer" may be composed of the processor 81 of the main body apparatus 2 and an information processing section of the controller.

The "game operation performed by using the main device and/or the sub device to which the main device is attached" may be an operation performed with the main device (e.g., an operation performed with a button provided on the right controller 4), an operation performed with the sub device to which the main device is attached (e.g., an operation performed with an operation portion provided on the sub device), or an operation performed with both of them (e.g., an operation of moving a portion of the sub device where the main device is attached).

According to the embodiment above, the game system 1 determines the type of the sub device to which the main device is attached while the game application is being executed, and executes a game process depending on the type of the sub device. Thus, the user can play the game while switching the sub device to which the main device is attached from one to another during the game, for example. Thus, the game system 1 can present, to the user, a novel gaming experience in which the user performs game operations while switching between sub devices during gameplay, for example, and it is possible to provide a game with high playability.

In the embodiment above, the game system 1 determines the type of the sub device to which the main device is attached based on the captured image that is captured by the image-capturing device (specifically, the infrared image capturing section 123). In other embodiments, the type of the sub device may be determined by a method other than using the image-capturing device. For example, where the main device and the sub device are electrically connected to each other via a connector or a cable, the game system 1 may determine the type of the sub device based on a signal received by the main device from the sub device via the connector or the cable. For example, when near field communication (e.g., communication in accordance with the NFC standard) is used between the main device and the sub device, the game system 1 may determine the type of the sub device based on a signal received by the main device from the sub device via near field communication.

While the main device is the right controller 4, which by itself can function as a controller device, in the embodiment above, the main device may be a device that does not by itself function as a controller device in other embodiments. For example, the main device may be configured to include the infrared image capturing section 123 and not include operation detection portions such as buttons and an acceleration sensor.

The "plurality of types of sub devices" each have a difference such that they can be distinguished from each other by a certain method. Specifically, in the present embodiment, the "plurality of types of sub devices" are a plurality of accessory controller devices that include different basic markers from each other (i.e., the first to third accessory controller devices 6 to 8). Note that in other embodiments, the game system 1 may include, as a plurality of types of sub devices, a plurality of accessory controller devices that have the same shape and that have different basic markers from each other. In other embodiments, the game system 1 may regard a plurality of accessory controller devices having different shapes from each other and having the same basic marker, as accessory controller devices of the same type.

In the embodiment above, one right controller 4 is used as a controller to be attached to an accessory controller device.

In other embodiments, for one game application, a plurality of controllers may be attached to an accessory controller device or accessory controller devices. For example, in other embodiments, the right controller 4 may be attached to an accessory controller device and the left controller 3 may be attached to another accessory controller device, wherein these two controller devices may be used for performing game operations in a game application. Since the left controller 3 does not have the function of detecting markers, the game system 1 may detect game operations that are performed with the left controller 3 based on the detection result from the acceleration sensor and/or the angular velocity sensor. In other embodiments, the right controller 4 and the left controller 3 may be attached at the same time to a single accessory controller device.

In other embodiments, the right controller 4 does not need to be attached directly to an accessory controller device, but may be attached indirectly to the accessory controller device. For example, in other embodiments, the right controller 4 may be attached to a holder, and the holder to which the right controller 4 is attached may be attached to one of the accessory controller devices.

There is no limitation on the content of the "game process depending on the determined type of the sub device". In the embodiment above, as the game process, the game system 1 accepts a different operation depending on the type of the sub device, and the game system 1 executes a process of controlling the action of an object in accordance with the operation (steps S9 and S10), a process of setting a virtual camera with a different position and a different attitude depending on the type of the sub device (step S11), and a process of generating a different game image depending on the type of the sub device (step S12). Note that in other embodiments, the game process may be a game process that is executed by using game parameters that are set for an object controlled by the user and that are set to different values depending on the type of the sub device (e.g., parameters representing the physical strength, the agility, the hit point, etc.). Then, the same game image may be used, irrespective of the type of the sub device.

As described above, the embodiment is applicable to, for example, a game system, a game program, or the like, with the aim of improving the playability of a game application with which accessory devices (i.e., sub devices) are used.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an information processing program to be executed by a game system that includes a plurality of types of game controller accessories and a game controller configured to be attached to and detached from any of the game controller accessories and that executes a game application, the information processing program causing the game system to execute:

determining the type of the game controller accessory to which the game controller is attached while the game application is being executed based on a captured image captured by an image capturing device of the game controller; and executing a game process based on a game operation performed by using the game controller and/or the game controller accessory to which the game controller is attached while the game application is being executed, wherein in the game process execution, a game process is executed depending on the determined type of the game controller accessory, each of the game controller accessories includes a detected portion of the captured image captured by the image-capturing device of the game controller that is attached to the game controller accessory, wherein the detected portion includes a first detected portion and a second detected portion;

at least one of the game controller accessories further includes a first movable portion that moves in accordance with a first operation performed by the user, wherein as the first movable portion is moved in accordance with the first operation performed by the user, a relative position and/or a relative attitude between the game controller attached to the game controller accessory including the first movable portion and the detected portion of the game controller accessory change, and a second movable portion that moves in accordance with a second operation performed by the user, wherein as the second movable portion is moved in accordance with the second operation performed by the user, a shape of the detected portion changes; and in the game process execution, an operation performed by the user is detected based on at least one of a position, a shape and an orientation of the first detected portion image and/or the second detected portion image representing at least a portion of the detected portion included in the captured image to execute a game process based on the detected user operation.

2. The storage medium of claim 1, wherein:

in the determining, the type of the game controller accessory to which the game controller is attached is determined based on at least one of a position, a shape and an orientation of the first detected portion image representing at least a portion of the detected portion included in the captured image.

3. The storage medium of claim 1, wherein:

the detected portion is at a position on the first movable portion such that an image thereof can be captured by the image-capturing device of the game controller attached to the game controller accessory including the first movable portion; and the relative position and/or the relative attitude between the game controller and the detected portion change as the detected portion moves with the first movable portion moved in accordance with an operation performed by the user.

4. The storage medium of claim 1; wherein:

the game controller is configured to be attached to the first movable portion; and the relative position and/or the relative attitude between the game controller and the detected portion change as the game controller attached to the first movable portion moves with the first movable portion moved in accordance with an operation performed by the user.

5. The storage medium of claim 1, wherein in the game process execution, a different game image is generated depending on the determined type of the game controller accessory.

6. The storage medium of claim 5, wherein the game process execution includes:

controlling an object placed in a virtual space based on a game operation using the game controller and/or the game controller accessory to which the game controller is attached; and changing the object depending on the determined type of the game controller accessory.

7. The storage medium of claim 6, wherein the object represents a vehicle on which a game character can ride.

8. The storage medium of claim 1, wherein:

the game controller includes a plurality of types of operation detection portions for detecting an operation performed by the user with the game controller; and in the game process execution, when it is determined that the game controller is attached to a certain type of a game controller accessory, a game process is executed based on a detection result from one of the plurality of types of operation detection portion that corresponds to the determined type of the game controller accessory.

9. The storage medium of claim 1, wherein:

the game controller includes an operation detection portion configured to detect operations performed by the user with the game controller; and in the game process execution, content of a game process to be executed based on a detection result from the operation detection portion is determined depending on the determined type of the game controller accessory.

10. The storage medium of claim 1, wherein in the game process execution, a position and/or an attitude of a virtual camera placed in a virtual space is controlled depending on the determined type of the game controller accessory.

11. The storage medium of claim 1, wherein in the determining, it is further determined that the game controller is attached to none of the game controller accessories.

12. The storage medium of claim 11, wherein in the game process execution, when it is determined that the game controller is attached to none of the game controller accessories, a game process is executed that is different from those executed when the game controller is attached to any of the game controller accessories.

13. The storage medium of claim 11, wherein:

the game system further includes a memory;

the processing program causes the game system to further execute, when it is determined that the game controller is attached to a certain type of a game controller accessory, storing, in the memory, device orientation information regarding an orientation of the game controller with respect to the certain type of the game controller accessory; and the game process execution includes:

executing a game process based on a direction operation performed by the user with the game controller; and when a transition is made from an attachment state where it is determined that the game controller is attached to the certain type of the game controller accessory to a non-attached state where it is determined that the game controller is attached to none of the game controller accessories, determining, based on the device orientation information stored in the memory in the attachment state, a relationship between a direction that is specified by the direction operation and content of a game process to be executed in response to the operation performed in the direction.

14. The storage medium of claim 2, wherein:

the information processing program causes the game system to further execute recognizing the first detected portion and recognizing the second detected portion based on the captured image; and the determining includes:

determining the type of the game controller accessory to which the game controller is attached based on at least one of a position, a shape and an orientation of a first portion image representing the first detected portion; and as a state of the game controller attached to the game controller accessory, determining a first state where the first detected portion is recognized and the second portion is not recognized, and a second state where the first detected portion and the second detected portion are recognized.

15. The storage medium of claim 14, wherein in the game process execution, a first game process is executed when it is determined that the game controller is in the first state, and a second game process different from the first game process is executed when it is determined that the game controller is in the second state.

16. The storage medium of claim 2, wherein:

the information processing program causes the game system to further execute recognizing the first detected portion and recognizing the second detected portion based on the captured image; and the determining includes:

determining the type of the game controller accessory to which the game controller is attached based on at least one of a position, a shape and an orientation of a first portion image representing the first detected portion; and determining a degree to which the game controller is attached to the game controller accessory based on a recognition result of the first detected portion and a recognition result of the second detected portion.

17. The storage medium of claim 16, wherein in the game process execution, a game process is executed depending on the degree to which the game controller is attached to the game controller accessory.

18. The storage medium of claim 14, wherein:

the game process execution includes:

detecting a first-type operation of the user based on at least one of a position, a shape and an orientation of a first portion image representing the first detected portion, and executing a game process based on the detected first-type operation; and detecting a second-type operation of the user based on at least one of a position, a shape and an orientation of a second portion image representing the second detected portion, and executing a game process based on the detected second-type operation.

19. The storage medium of claim 16, wherein:

the game process execution includes:

detecting a first-type operation of the user based on at least one of a position, a shape and an orientation of a first portion image representing the first detected portion, and executing a game process based on the detected first-type operation; and detecting a second-type operation of the user based on at least one of a position, a shape and an orientation of a second portion image representing the second detected portion, and executing a game process based on the detected second-type operation.

20. An information processing system comprising a plurality of types of game controller accessories and a game controller capable of being attached to and detached from any of the game controller accessories and configured to execute a game application, the information processing system comprising:
   one or more processor, the one or more processor executes:
      determining the type of the game controller accessory to which the game controller is attached while the game application is being executed based on a captured image captured by an image capturing device of the game controller; and
      executing a game process based on a game operation performed by using the game controller and/or the game controller accessory to which the game controller is attached while the game application is being executed, wherein a game process is executed depending on the determined type of the game controller accessory, wherein
   each of the game controller accessories includes a detected portion of the captured image captured by the image-capturing device of the game controller that is attached to the game controller accessory, wherein the detected portion includes a first detected portion and a second detected portion;
   at least one of the game controller accessories further includes
      a first movable portion that moves in accordance with a first operation performed by the user, wherein as the first movable portion is moved in accordance with the first operation performed by the user, a relative position and/or a relative attitude between the game controller attached to the game controller accessory including the first movable portion and the detected portion of the game controller accessory change, and
      a second movable portion that moves in accordance with a second operation performed by the user, wherein as the second movable portion is moved in accordance with the second operation performed by the user, a shape of the detected portion changes; and
   in the game process execution, an operation performed by the user is detected based on at least one of a position, a shape and an orientation of the first detected portion image and/or the second detected portion image representing at least a portion of the detected portion included in the captured image to execute a game process based on the detected user operation.

21. An information processing apparatus for executing a game application, the information processing apparatus included in a game system comprising a plurality of types of game controller accessories and a game controller capable of being attached to and detached from any of the game controller accessories, the information processing apparatus comprising:
   one or more processor, the one or more processor executes:
      determining the type of the game controller accessory to which the game controller is attached while the game application is being executed based on a captured image captured by an image capturing device of the game controller; and
      executing a game process based on a game operation performed by using the game controller and/or the game controller accessory to which the game controller is attached while the game application is being executed, wherein a game process is executed depending on the determined type of the game controller accessory, wherein
   each of the game controller accessories includes a detected portion of the captured image captured by the image-capturing device of the game controller that is attached to the game controller accessory, wherein the detected portion includes a first detected portion and a second detected portion:
   at least one of the game controller accessories further includes
      a first movable portion that moves in accordance with a first operation performed by the user, wherein as the first movable portion is moved in accordance with the first operation performed by the user, a relative position and/or a relative attitude between the game controller attached to the game controller accessory including the first movable portion and the detected portion of the game controller accessory change, and
      a second movable portion that moves in accordance with a second operation performed by the user, wherein as the second movable portion is moved in accordance with the second operation performed by the user, a shape of the detected portion changes; and
   in the game process execution, an operation performed by the user is detected based on at least one of a position, a shape and an orientation of the first detected portion image and/or the second detected portion image representing at least a portion of the detected portion included in the captured image to execute a game process based on the detected user operation.

22. An information processing method to be executed on an information processing system, the information processing system configured to execute a game application and including a plurality of types of game controller accessories and a game controller capable of being attached to and detached from any of the game controller accessories, the information processing method comprising:
   determining the type of the game controller accessory to which the game controller is attached while the game application is being executed based on a captured image captured by an image capturing device of the game controller; and
   executing a game process based on a game operation performed by using the game controller and/or the game controller accessory to which the game controller is attached while the game application is being executed,
   a game process is executed depending on the determined type of the game controller accessory, wherein
   each of the game controller accessories includes a detected portion of the captured image captured by the image-capturing device of the game controller that is attached to the game controller accessory, wherein the detected portion includes a first detected portion and a second detected portion;
   at least one of the game controller accessories further includes
      a first movable portion that moves in accordance with a first operation performed by the user, wherein as the first movable portion is moved in accordance with the first operation performed by the user, a relative position and/or a relative attitude between the game controller attached to the game controller accessory including the first movable portion and the detected portion of the game controller accessory change, and a second movable portion that moves in accordance with a second operation performed by the user, wherein as the second movable portion is moved in accordance with the second operation performed by the user, a shape of the detected portion changes; and in the game process execution, an operation performed by the user is detected based on at least one of a position, a shape and an orientation of the first detected portion image and/or the second detected portion image representing at least a portion of the detected portion included in the captured image to execute a game process based on the detected user operation.

23. The storage medium of claim 5, wherein the different game image generated depending on the determined type of the game controller accessory is a game image to be controller during gameplay.

24. A non-transitory computer-readable storage medium storing an information processing program to be executed by a game system that includes a plurality of types of game controller accessories and a game controller configured to be attached to and detached from any of the game controller accessories and that executes a game application, the information processing program causing the game system to execute:

determining the type of the game controller accessory to which the game controller is attached while the game application is being executed; and executing a game process based on a game operation performed by using the game controller and/or the game controller accessory to which the game controller is attached while the game application is being executed, wherein in the game process execution, a game process is executed depending on the determined type of the game controller accessory, and in the game process execution, a different game image to be controlled during gameplay is generated depending on the determined type of the game controller accessory, wherein each of the game controller accessories includes a detected portion of the captured image captured by the image-capturing device of the game controller that is attached to the game controller accessory, wherein the detected portion includes a first detected portion and a second detected portion;

at least one of the game controller accessories further includes a first movable portion that moves in accordance with a first operation performed by the user, wherein as the first movable portion is moved in accordance with the first operation performed by the user, a relative position and/or a relative attitude between the game controller attached to the game controller accessory including the first movable portion and the detected portion of the game controller accessory change, and a second movable portion that moves in accordance with a second operation performed by the user, wherein as the second movable portion is moved in accordance with the second operation performed by the user, a shape of the detected portion changes; and in the game process execution, an operation performed by the user is detected based on at least one of a position, a shape and an orientation of the first detected portion image and/or the second detected portion image representing at least a portion of the detected portion included in the captured image to execute a game process based on the detected user operation.

\* \* \* \* \*